United States Patent [19]
Jordan, II et al.

[11] Patent Number: 5,412,805
[45] Date of Patent: May 2, 1995

[54] APPARATUS AND METHOD FOR EFFICIENTLY ALLOCATING MEMORY TO RECONSTRUCT A DATA STRUCTURE

[75] Inventors: Lloyd E. Jordan, II; Shaw-Ben Shi; Martin J. Sirkin, all of Austin; Paul E. Stephens, Cedar Park, all of Tex.

[73] Assignee: International Business Machines Corporation, Armonk, N.Y.

[21] Appl. No.: 923,633

[22] Filed: Aug. 3, 1992

[51] Int. Cl.⁶ .............................................. G06F 17/00
[52] U.S. Cl. ............................ 395/600; 364/DIG. 1; 364/844; 395/250; 395/575; 395/700; 395/200; 395/275
[58] Field of Search ................ 395/650, 54, 600, 700, 395/575, 200, 250, 325

[56] References Cited

U.S. PATENT DOCUMENTS

| | | | |
|---|---|---|---|
| 4,511,964 | 4/1985 | Georg et al. | 364/DIG. 1 |
| 4,893,232 | 1/1990 | Shimsoka et al. | 364/DIG. 1 |
| 5,008,853 | 4/1991 | Bly et al. | 364/DIG. 2 |
| 5,014,221 | 5/1991 | Mogul | 364/519 |
| 5,025,491 | 6/1991 | Tsuchiya et al. | 340/825.52 |
| 5,175,817 | 12/1992 | Adams et al. | 395/200 |
| 5,179,555 | 1/1993 | Videlock et al. | 370/85.13 |
| 5,265,250 | 11/1993 | Andrade et al. | 395/650 |
| 5,301,260 | 4/1994 | Miyashita | 395/54 |
| 5,301,280 | 4/1994 | Schwartz et al. | 395/325 |

*Primary Examiner*—Thomas G. Black
*Assistant Examiner*—Cuan Pham
*Attorney, Agent, or Firm*—Keith Stephens; Diana L. Roberts

[57] ABSTRACT

A method, system and process for enhancing a database server by improving memory allocation and memory copying during the process of reconstructing a data structure.

16 Claims, 5 Drawing Sheets

ID
APPARATUS AND METHOD FOR EFFICIENTLY ALLOCATING MEMORY TO RECONSTRUCT A DATA STRUCTURE

FIELD OF THE INVENTION

This invention generally relates to improvements in database processing and more particularly to enhancing remote access to a database.

BACKGROUND OF THE INVENTION

System management of remote access to a database is the subject of numerous articles and patents. For example, U.S. Pat. No. 5,014,221 discloses a print server with arbitrated client access, U.S. Pat. No. 4,511,964 discloses dynamic memory mapping for a memory controller that serves to effectuate the allocation, extension and deallocation of dynamic structures, and U.S. Pat. No. 5,025,491 discloses a communication network with associated server stations and server addresses resolved by a computer algorithm. However, none of the prior art references that applicant is aware of discloses the enhanced database server of the subject invention.

SUMMARY OF THE INVENTION

Accordingly, it is a primary objective of the present invention to provide an enhanced database server.

These and other objectives of the present invention are accomplished by the operation of a process in the memory of a processor that enhances memory allocation and memory copying during the process of reconstructing a data structure. The computer constructs a data structure in a memory on a first computer for use in accessing information from a database on a second computer, by obtaining a memory requirement data structure from the database on the first computer and constructing a communication buffer containing the memory requirement data structure and information from the database. The communication buffer is thereafter transmitted to the second computer. The second computer receives the communication buffer on the second computer and determines the memory requirements for the data structure based on information in the communication buffer. Finally, a data structure is built based on the memory requirement data structure on the second computer using the memory already allocated to the communication buffer in the second computer.

DETAILED DESCRIPTION OF THE INVENTION

Figure 1:
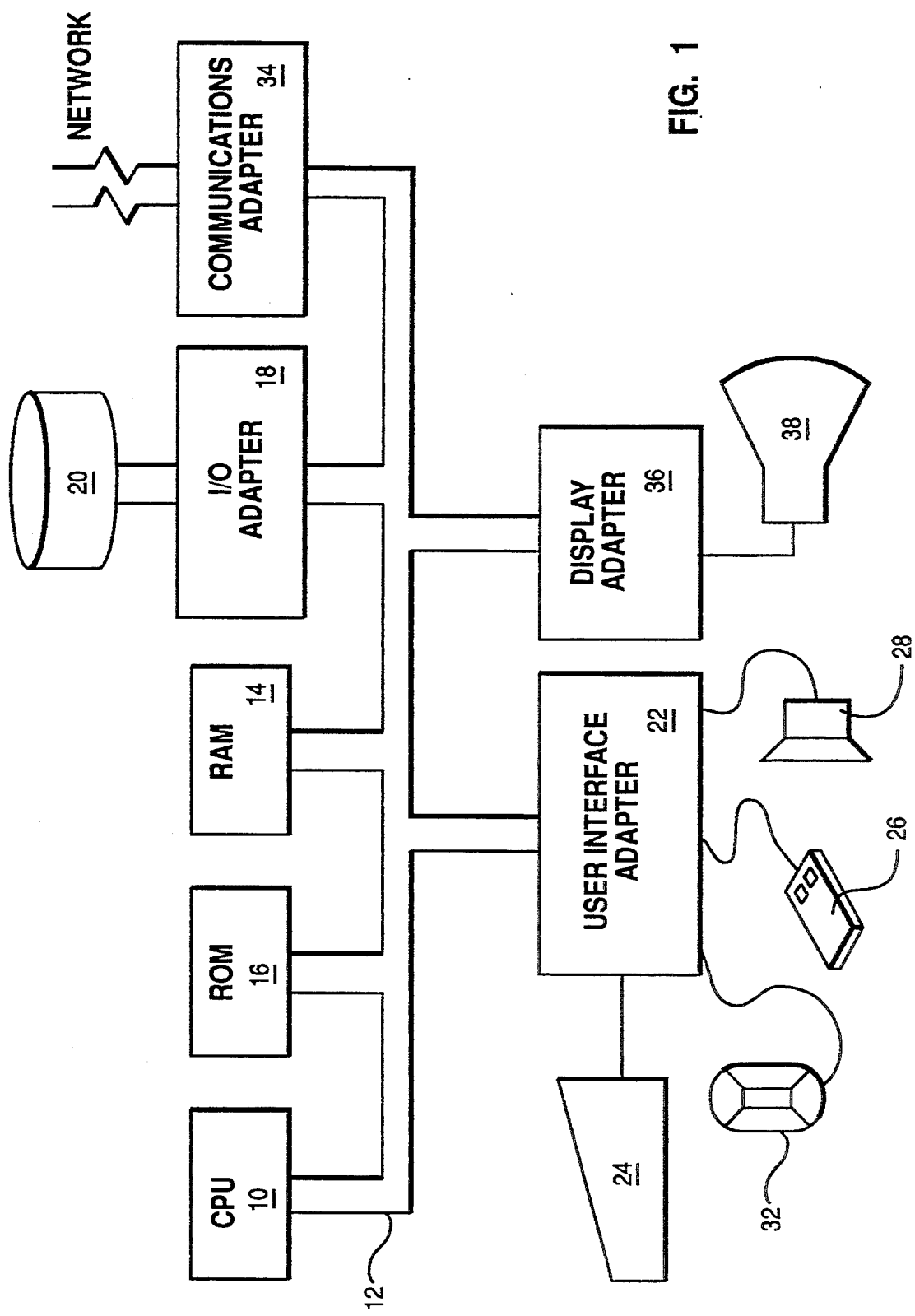
FIG. 1 is a block diagram of a personal computer system in accordance with the subject invention.

The invention is preferably practiced in the context of an operating system resident on an IBM PS/2 computer available from IBM Corporation. A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation has resident thereon the AIX operating system and the computer software making up this invention which is included as a toolkit.

A private protocol was implemented in IBM's OS/2 1.3 Extended Edition (EE) operating system to provide remote access to a relational database. The protocol is discussed in detail in two IBM publications, 1. *Distributed Relational Database Architecture Reference*, August 1990, IBM, SC26-4651; and 2. *Distributed Data Management (DDM) Architecture Reference*, August 1990, IBM, SC21-9526. Performance tests uncovered a problem with the memory allocation and memory copying during the process of reconstructing the database data structures.

The invention comprises an efficient design for server memory allocation for a remote protocol. The protocol is designed for OS/2 Extended Services (ES) 1.0 Remote Database Service. The system uses a communication buffer without allocating extra storage for reconstructing data structures. It reduces memory requirement for the server, and reduces the cost of memory copying.

Compared with the previous design in OS/2 1.3 Extended Edition (EE), the current remote protocol achieves up to 56 percent speedup in throughput and 36 percent speedup in end user response time. The design of SQLJRA remote protocol leverages data structures built on either the client or the server in a homogeneous environment that are similarly structured. Therefore, the underlying data structures are passed directly, without the conversion step being necessary.

On the client, a data stream constructor builds a data stream from the data structures. If the data G structure contains a pointer, the actual data pointed to by those pointers will be placed in the data stream. The data structure reconstructor on the server builds the data structures according to the data string received from the client. In order to rebuild the engine data structures on the server, the server needs to allocate memory for the data structures. The invention addresses the problem of how to allocate memory efficiently to reconstruct the data structures.

In OS/2 ES 1.0 database manager, each client and server has its own communication buffer to store the information sent and received. The size of the communication buffer is determined by the block size in the database configuration file. The minimum size of the communication buffer is 4K. The requestor will put data in the communication buffer and invoke communication routines to actually send the data. The server receives data from its own communication buffer.

Before the client puts the engine data structures into the communication buffer, the client must first calculate the total memory required by the database data structures. The database data structures include the JRA control structure, input SQLDA, output SQLDA and SQLCA. The memory requirement information will be put into the communication buffer. Then, the client copies the control structures into the communication buffer. If the communication buffer is filled up, the client calls the communication routines to send the buffer to the server.

The server, then, calls communication routines to receive data. The data sent by the client will be in server's communication buffer. Since the client put the memory requirement information into its communication buffer first, the server will receive it in the first buffer received. The server will then use this information to allocate memory for data structures.

Let the memory needed by the engine data structure be M, the size of the communication buffer be B and size of a segment be S. A segment is the maximum virtual memory that can be allocated for each memory allocation call. For example, a maximum segment size for 16 bit OS/2 is 64K. First, if the memory needed by the engine data structure (M) is less than the size of the communication buffer (B), then NO extra memory is needed. Since we passed these data structures in their native form, we can make use of the communication buffer to rebuild the engine data structure back. The client simply locates the starting position of each data structure, and assigns a new address to the pointer fields in the SQLJRA.

Figure 2:
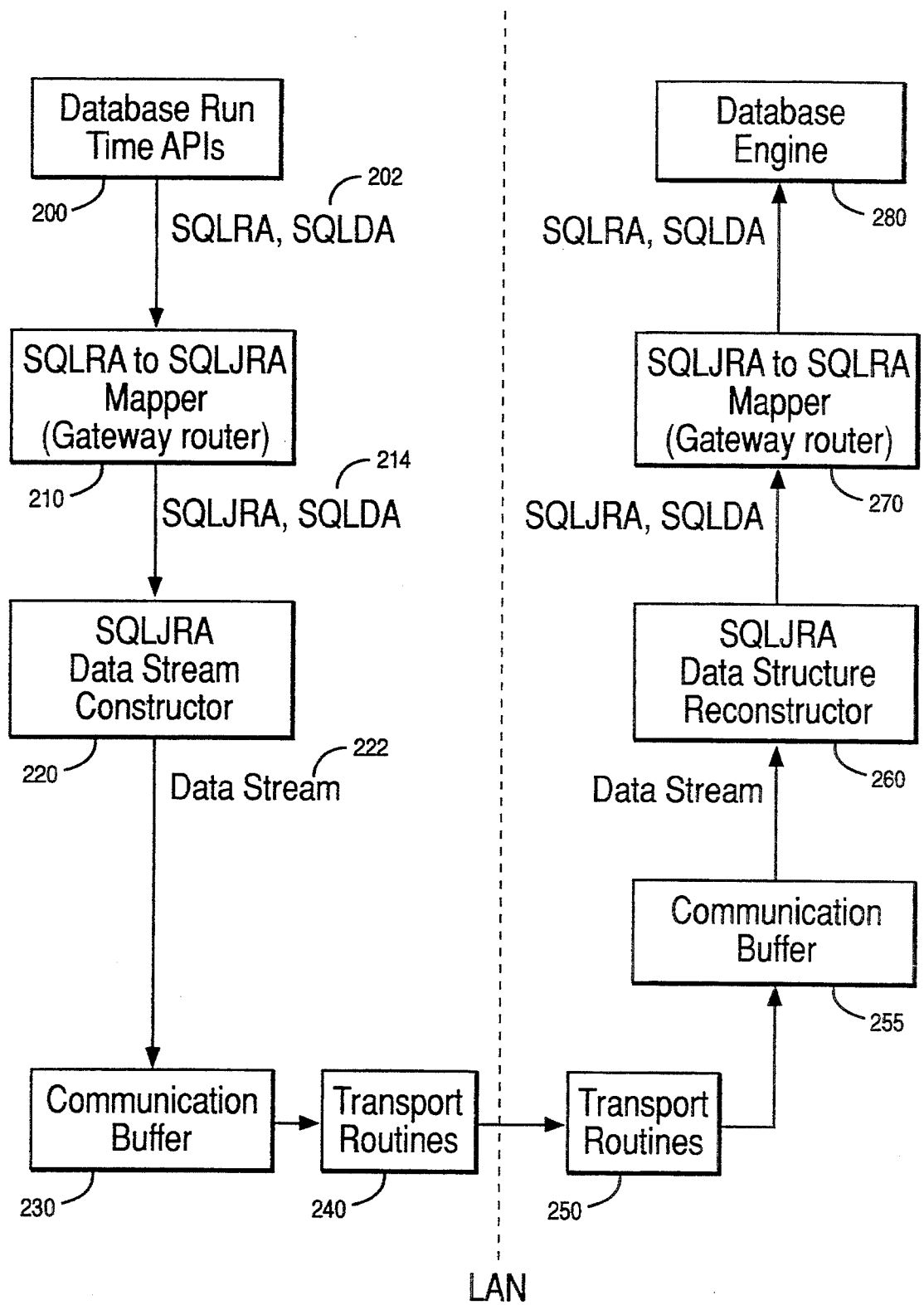
FIG. 2 is an example of the system control flow of a remote database request in accordance with the subject invention.

FIG. 2 illustrates a sample flow of information for remote database requests. First, the database runtime API routines 200 prepare database engine data structures 202 from user's SQL request. These data structures include SQLRA 202 (SQL Request Area) and SQLDA 202 (SQL Data Area). Then, the Gateway mapper 210 maps SQLRA to SQLJRA (Gateway Interface Request Area). The data structures (SQLJRA and SQLDA) 214 are given to the SQLJRA data stream constructor. Then, the SQLJRA data stream constructor 220 calculates the memory requirement for the data stream 222.

The information about the memory requirement will be put into a data structure (SQLCPLEN) which will be described later. SQLJRA data stream constructor will also construct a data stream 222 from the data structures and put the data stream into the communication buffer 230. The database manager transport routines 240/250 transmit the communication buffer to the server through transport layer communication protocol.

On the server side, the database manager 280 transport routines receives the data stream into a communication buffer 255. The first thing that the SQLJRA data structure reconstructor 260 gets from the communication buffer 255 is the memory requirement data structure. With the information in the memory requirement data structure, the server calculates what is the total memory requirement to reconstruct the data structure. The data structure reconstructor allocates appropriate memory size, receives data from the data stream into the allocated memory and rebuilds the data structure.

The reconstructed data structure is given to the gateway router 270 which maps the SQLJRA gateway interface structure into SQLRA which is the data structure that the database actually employs. The SQLRA and SQLDA are given to the database 280 to perform the SQL request.

Figure 3:
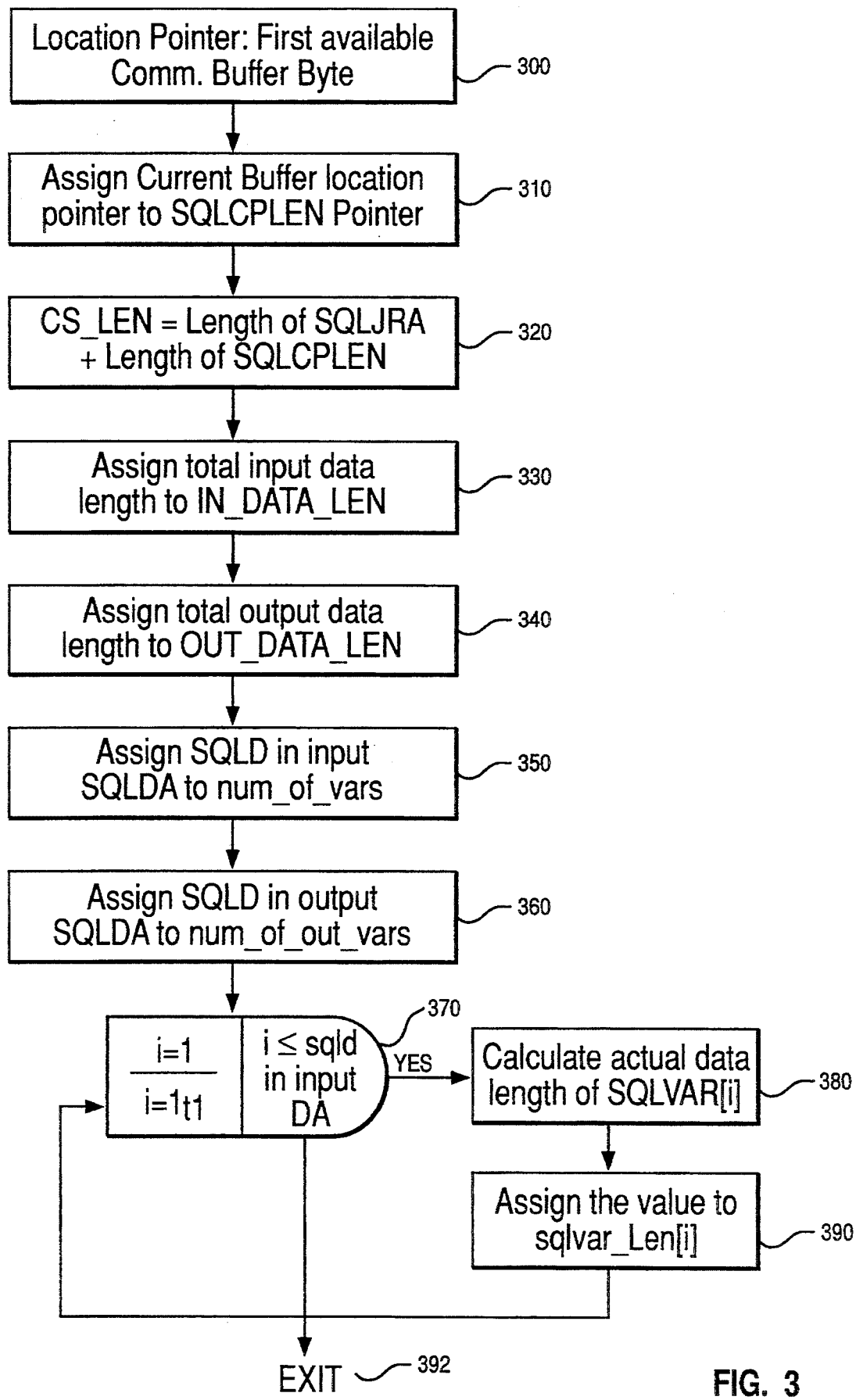
FIG. 3 is a flowchart setting forth the detailed logic in accordance with the subject invention.

FIG. 3 is the detailed flowchart of SQLJRA data stream constructor on the client. As mentioned above, the data stream constructor needs to prepare a data structure which contains the memory requirement information needed by the server. Processing commences at function block 300 where a location pointer is initialized to the first available record in the communication buffer. Then, in function block 310, the current buffer location pointer is assigned to G SQLCPLEN, the length of the two data structures are calculated in function block 320, and total input and output data lengths are assigned to the appropriate variables as shown in function blocks 330 and 340. Then, the number of variables for input and output are calculated and placed in the communication buffer as shown in function block 350 and 360. Finally in function blocks 370, 380 and 390 the length of each variable in the communication buffer are recorded and an exit is performed at terminal 392.

DATA STRUCTURE IN ACCORDANCE WITH THE SUBJECT INVENTION

The following is the control structure that the client passes to the server to indicate the memory and data length information.

```
struct sqlcplen
{
    unsigned long cs_len;
    unsigned long in_data_len;
    unsigned long out_data_len;
    unsigned long num_of_vars;
    unsigned long num_of_out_vars;
    unsigned long sqlvar_len[1];
};
```

An intuitive approach to building this data structure is to define a structure, to assign values in the structure and then move it into the communication buffer. Instead, a control structure is built in the communication buffer and values are stored in the appropriate control structures. In this case, it is not necessary to copy the control structure into the data stream.

CS_LEN is the total length of the control structures which include SQLJRA and SQLCPLEN. The server uses this information to locate the end of the control structure.

IN_DATA_LEN is the length of user input data area.

OUT_DATA_LEN is the length of the user output data area.

IN_DATA_LEN and OUT_DATA_LEN are used not only for calculating the total memory space needed for data structures but also used for calculating number of segments needed for user input and output data area.

NUM_OF_VARS is the number of input and output sqlvars. The value of NUM_OF_VARS is passed from SQLD in the user input SQLDA.

NUM_OF_OUT_VARS is the number of output sqlvars. The value of NUM_OF_OUT_VARS is passed from SQLD in the user output SQLDA.

SQLVAR_LEN is an array to store the actual data length of each sqlvar. Each SQLVAR in the user's input SQLDA will be inspected to get the actual data length. The server uses the NUM_OF_VARS to calculate the input SQLDA length (IN_DA_LEN) and use NUM_OF_OUT_VARS to calculate the output SQLDA length (OUT_DA_LEN).

Figure 4:
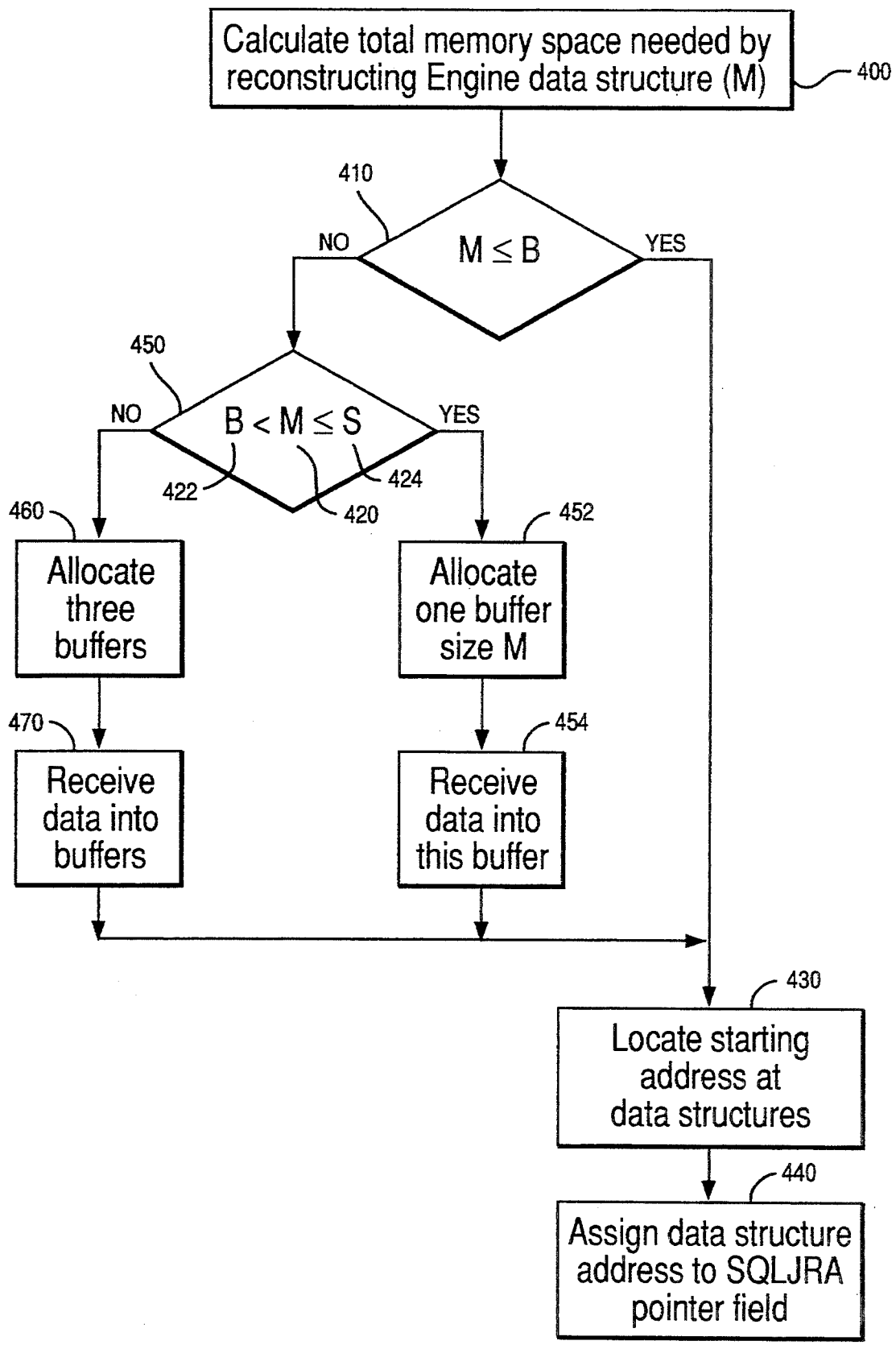
FIG. 4 is a flowchart setting forth the detailed logic of a remote protocol server in accordance with the subject invention.

FIG. 4 is a detailed flowchart of the data structure reconstructor on the server. The first thing that the data structure reconstructor gets from the communication buffer is the SQLCPLEN data structure. With the information in SQLCPLEN data structure, as shown in function block 400, the server can calculate the total memory space needed (M) 420 for data structures with the following formula:

$$M = CS\_LEN + IN\_DA\_LEN + OUT\_DA\_LEN + IN\_DATA\_LEN + OUT\_DATA\_LEN$$

Let the size of the communication buffer be B 422 and size of a segment be S 424. A segment (S) 424 is the maximum virtual memory that can be allocated for each memory allocation call. For example, a maximum segment size for 16 bit OS/2 is 64K. First, as shown in decision block 410, if the memory needed by the data structure (M) is less than the size of the communication buffer (B), then NO extra memory is needed. Since SQLJRA remote protocol passed these data structure in its native forms, we can make use of the communication buffer to rebuild the data structure back. The client need only locate the starting position of each data structure, and assign the new address to the pointer fields in the SQLJRA. If no extra memory is needed at decision block 410, then processing is completed at function blocks 430 and 440 where the starting addresses of the data structures are located and the address is assigned to the proper pointer.

If extra memory is necessary when a test is performed at decision block 410, then a further test is performed at decision block 450 to determine if the total memory necessary is greater than the segment size. If so, then three buffers are allocated as shown in function block 460, data is received into the three buffers as shown in function block 470, and control is passed to function blocks 430 and 440 where the starting addresses of the data structures are located and the address is assigned to the proper pointer.

If the test at decision block 450 to determine if the total memory necessary is greater than the segment size shows that one segment is the maximum amount of G memory necessary, then one buffer is allocated as shown in function block 452, data is received into the single buffer as shown in function block 454, and control is passed to function blocks 430 and 440 where the starting addresses of the data structures are located and the address is assigned to the proper pointer.

Figure 5:
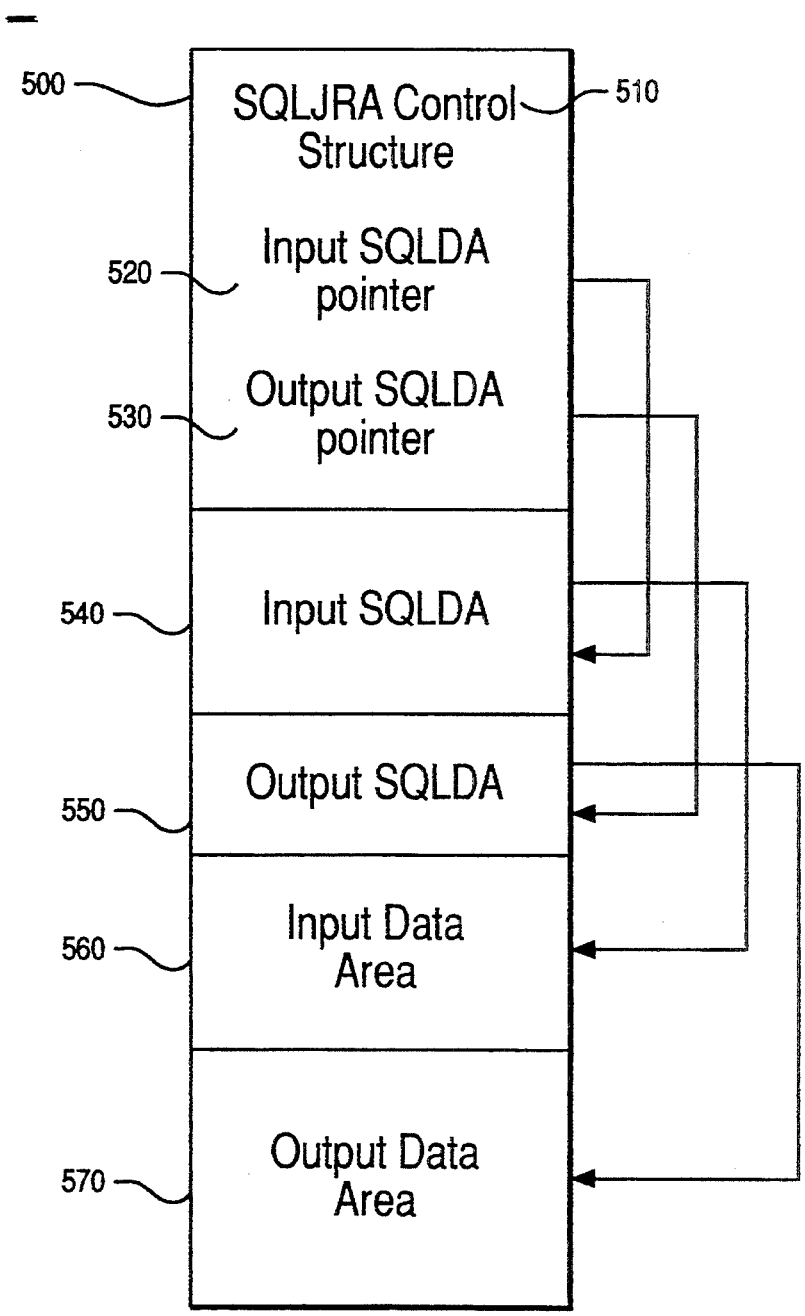
FIG. 5 is an example of building a data structure in the communication buffer in accordance with the subject invention.

FIG. 5 is an example of accommodating all data structures in a single communication buffer 500. The input SQLDA pointer 520 in SQLJRA 510 points to the input SQLDA area 540 in the communication buffer and the output SQLDA pointer 530 points to the output SQLDA 550. The input and output SQLDA each have corresponding data areas 560 and 570. Most of the data structures generated for user queries fit into ONE communication buffer whose minimum size is 4K as shown in FIG. 4. In this case, no extra memory is needed for reconstructing data structures.

Second, if M is larger than B and less than S, the server allocates ONE buffer with size M. All the data structures be received into this buffer in order. Then, the pointers are adjusted as in the first case after all data is received.

Third, if M is larger than S, the server allocate at least three buffers. The first buffer is for control structures SQLJRA and SQLCA. The second buffer is for input SQLDA and the third buffer is for output SQLDA. The second or the third buffer can be more than one segment depending on the user's data. Additional buffers are allocated to accommodate input and output data.

CLIENT CODE

```
*                                                    *
* MODULE NAME:      sqlcpreq                         *
*                                                    *
* COMPONENT NAME:   Distributed Data Services        *
*                                                    *
* (C) COPYRIGHT IBM CORP 1991                        *
*
*     This module contains a set of functions to construct the JRA data    *
*     stream and send it to the server.                                    *
*     Functions in this module are:                                        *
*         sqlcpreq                                                         *
*         sqlcpreq_send                                                    *
*         sqlcpreq_receive                                                 *
*         sqlcpmd                                                          *
*         sqlcpga                                                          *
*                                                    *
* COMPILER OPTIONS:                                  *
*     Standard                                       *
*
***************************************************************************/
define LINT_ARGS 1 include "sqlz.h"
include "sqlo.h"
#include "sqlocall.h"
#include "sqlenv.h"
#include "sqljacb.h"
#include "sqljra.h"
#include "sqljrai.h"
#include "sqler.h"
#include "sqlra.h"
#include "sqlca.h"
```

```c
#include "sqlcc.h"
#include "sqlcm.h"
#include "sqlcmi.h"
#include "sqle.h"
#include "sqlei.h"
#include "sqltc.h"
#include "sqlchdda.h"
#include "sqlc.h"
#include "sqlci.h"
#include "sqlcodes.h"
#include "sqlrx.h"
#include "sqlda.h"
#include "sql.h"
#include "sqlcitoh.h"
#include "sqlcpccb.h"
#include "sqltc.h"
#include "sqlcpcom.h"
#include "sqlcpreq.h"
                                        /* Pointer to cursor control block    */
struct sqlcp_ccb *near ccbptr = NULL;

extern SQLE_GLOB far sqleglob;

#define JRASIZE sizeof(SQLJDSRA)

int SQLZ_LOCAL sqlcpsnd(struct sqlcacb *ddsacb, SQLJDSRA *dcsra);

int SQLZ_LOCAL sqlcprrv(struct sqlcacb *ddsacb,
                SQLJDSRA *dcsra);

void SQLZ_DYNLINK sqlcpsca(struct sqlca *sqlcaptr, unsigned char *pgmn,
                long sqlcode);
unsigned int  SQLZ_DYNLINK sqlcpdls (struct sqlvar *t_sqlvar);
unsigned int SQLZ_DYNLINK sqlcpdlr(struct sqlvar *t_sqlvar);

int SQLZ_DYNLINK sqlcpccb(struct sqlcacb *ddsacb,
                struct sqlcp_ccb **list,
                struct sqlcp_ccb **csr_ptr,
                unsigned short section,
                unsigned char *crea,
                unsigned short cre_len,
                unsigned char *pgmn,
                unsigned short pg_len,
                short is_this_req);

int SQLZ_DYNLINK sqlcpdcb(struct sqlcacb *ddsacb,
                struct sqlcp_ccb **list,
                struct sqlcp_ccb *csrptr,
                short is_this_req);

int SQLZ_DYNLINK sqlcpdac(struct sqlcacb *ddsacb,
                struct sqlcp_ccb **list,
                unsigned char delflag,
                short is_this_req);

unsigned int sqlcp_get_maxmem( struct sqlda *sqlda);

void SQLZ_LOCAL sqlcp_get_ca_retcode(struct sqlca *sqlca,
                        short *ddsretcode,
                        char *combuf,
                        int *buf_loc);

int SQLZ_LOCAL sqlcp_get_data(struct sqlcacb *ddsacb,
                struct sqlda *sqlda,
                struct sqlcp_ccb *ccb,
                char *combuf,
                int *buf_loc, struct sqlca *sqlca);

short SQLZ_DYNLINK sqlcpgd(struct sqlcacb *ddsacb,
                unsigned char **cb_ptr_ptr,
                unsigned char *comm_buffer,
                char *dest , unsigned int total_len,
                unsigned short cstrtype);

short SQLZ_DYNLINK sqlcpmd(struct sqlcacb *ddsacb,
                unsigned int *location,
                char *data, unsigned int datalen,
                struct sqlca *sqlca);
```

```c
int SQLZ_DYNLINK sqlcpreq (SQLJACB *dcsacb,
                           struct sqlcacb *ddsacb,
                           SQLJDSRA *dcsra);

void SQLZ_DYNLINK sqlcperc(struct sqlccom *comhandle,
                           struct sqlca *sqlcaptr,
                           unsigned char *pgmn );

/*****************************************************************************/
/* SQLCPSND:                                                                 */
/*     Function: Construct JRA data stream and send it to the server.        */
/*     Input:                                                                */
/*          Pointer to ddsacb                                                */
/*          Pointer to dcsra                                                 */
/*     Output:                                                               */
/*          - The output SQLDA pointed by the dcsra                          */
/*****************************************************************************/ int  SQLZ_LOCAL sqlcpsnd (struct sqlcacb *ddsacb,
                          SQLJDSRA *dcsra)

{
  unsigned int loc;              /* Com buffer location pointer   */
  int i;                         /* Loop counter                  */
  short buffer_len;              /* Length of the com buffer      */
  SQLJDATA *triplet;             /* Current triplet pointer       */
  char *combuf;                  /* Comm buffer pointer           */
  struct sqlcplen *dslenptr;     /* Pointer to the data stream length */
                                 /* structure in the com buffer   */

/* Actual length of input sqlvars */
                                 /* Static allocated              */
  unsigned long sqlvar_actlen_in FSTATIC_VARS ;
  unsigned long *act_len_in;     /* Actual length of input sqlvars */
                                 /* Flag to indicate whether the actual*/
                                 /* length array has been allocated for*/
                                 /* input DA                      */
  unsigned short alloc_flag_in = 0;
  unsigned long jra_parm_len = 0;  /* JRA parameter length        */
  unsigned int da_size;          /* size of the DA                */
  unsigned int out_da_size = 0;    /* size of the output DA       */
  struct sqlda *in_da;           /* Input DA pointer              */
  struct sqlda *out_da = NULL;     /* Outpout DA pointer          */
  struct sqlca *ca_ptr;          /* SQLCA pointer                 */
  struct sqlvar *sqlvar;
  struct sqlda *run_da= NULL;      /* SQLDA allocated to store run stat */
                                 /* index list                    */
  struct sqlda *useroutda;         /* User output da              */
  char *index_ptr;                 /* index name for runstat      */
  unsigned int run_da_size;        /* DA size allocated for runstat */
  short no_index;                  /* Number of runstat indexes   */
                                 /* The following variables are for */
                                 /* cursor operations             */
  struct sqlcp_ccb *temp_ccb;
  SQLJDSRA *comra;                 /* JRA in the com buffer       */
  int retcode = 0;
  int err_retcode = 0;             /* Positive error return code  */
  short zero = 0;

/*****************************************************************************
The communication buffer(s) contain the following in order

|ll |sqljra |control strucutre length | input data length

| output data length | Array of input sqlvar actual length

|JRA parm length JRA parm | Input SQLDA | Output SQLDA |

|Input data length

*****************************************************************************
/
                                 /* Set up location into communications*/
                                 /* buffer skipping ll field      */
  loc = SQLC_SHORT_SIZE;
```

```c
                                    /* Pick up the CA pointer          */
ca_ptr = (struct sqlca *)dcsra->sqlrcap;

if (req_open_cursor)
{
    ccbptr = (struct sqlcp_ccb * ) NULL;
                                    /* If ask_no_blocking flag was not set*/
                                    /* , use blocking as the default   */
                                    /* Create a cursor control block    */
    if (! ask_no_blocking)
    {
        retcode = sqlcpccb(ddsacb, &req_ccbs, &ccbptr,
                    (unsigned short) *(dcsra->sqlrsect),
                    dcsra->sqlrcrea, (unsigned short) dcsra->sqlrcrel,
                    dcsra->sqlrpgmn, (unsigned short) dcsra->sqlrpgml,
                    TRUE);

/*Increment the indicator array    */
                                    /*triplet length by one to accomdate */
                                    /*the blocking flag (the blocking flag*/
                                    /*is used only by JRA requestor and  */
                                    /*server                           */
        dcsra->sqlrflgl++;
    }
                                    /* If cursor control block can be  */
                                    /* allocated successfully, then ask */
                                    /* for blocking. Otherwise, ask for */
                                    /* no blocking                     */
    if ((retcode == 0) && (! ask_no_blocking) )
    {
        dcsra->sqlrflag FSQLCP_OFF_BLKREQ = SQLCP_BLOCK;
    }
    else
    {
        dcsra->sqlrflag FSQLCP_OFF_BLKREQ = SQLCP_NO_BLOCK;
                                    /* Set positive return code        */
        err_retcode |= retcode;
    }
}                                   /* End open cursor check            */

/* If close cursor, find the cursor */
                                    /* control block and delete it.     */
if (req_close_cursor)
{
    sqlcpcsr(temp_ccb,req_ccbs,(short) *(dcsra->sqlrsect),
            dcsra->sqlrcrea,(int) dcsra->sqlrcrel,
            dcsra->sqlrpgmn,(int) dcsra->sqlrpgml);
    if (temp_ccb != NULL)
    {
        retcode = sqlcpdcb(ddsacb, &req_ccbs, temp_ccb, TRUE);
        err_retcode |= retcode;
        if (retcode == SQLJR_RCF_TERMINATE)
        {
            goto exit;
        }
    }
}
                                    /* If the JRA request is runstat,   */
                                    /* allocate a DA to store index list. */
                                    /* We also allocate the pointer space */
                                    /* for the server at the same time  */
                                    /* Put index name into the sqlname  */
                                    /* field of the DA and set the dcsra */
                                    /* pointer points to the DA created  */
                                    /* After all data is put into the DA */
                                    /*, adjust the parameter pointer    */
                                    /* points the space allocated for the */
                                    /* da                              */
if (req_runstat)
{ no_index = (short) dcsra->sqlrdata F1 .sqlrdtl;
    index_ptr = dcsra->sqlrdata F1 .sqlrdtp;
    dcsra->sqlrdata F1 .sqlrdtl *= SQLC_LONG_SIZE;
    run_da_size = SQLDASIZE(no_index);
    retcode = sqlogblk(ddsacb->rsheap, run_da_size, &run_da);
    if ( retcode < 0 )
    {
        sqlcpsca(ca_ptr, "SQLCPREQ",(long) SQL_RC_E961);
```

```
       sqlt_trace_error(SQLT_SQLC, SQLT_SQLCPREQ, 101,
sizeof(short),&retcode);
          err_retcode |= SQLJR_RCF_SQLCA;
          goto exit;
     }
     dcsra->sqlrdapi = (char *)run_da;
     dcsra->sqlrdail = (long) run_da_size;
     dcsra->sqlrdait = SQLJ_TYP_INSQLDA;

/* set sqld to be number of index   */
     run_da->sqld = no_index;
                              /* copy index name into sqlname field */
                              /* in sqlvar                       */
     for (i=0; i < no_index; i++)
     {
                              /* strcpy need to be changed to OSS */
                              /* later....                       */
         strcpy(run_da->sqlvar[i].sqlname.data, *((char **)index_ptr));
         index_ptr += SQLC_LONG_SIZE;
     }

}

/* Pick up the input and output DA ptr*/
in_da = (struct sqlda *)dcsra->sqlrdapi;

/* Allocate space for the temporary  */
                              /* output da and copy userda into it */
useroutda =(struct sqlda *)dcsra->sqlrdapo;
if ( useroutda != NULL)
{
                              /* Initialize sqld field in the user */
                              /* DA, otherwise garbage sqld value  */
                              /* will cause unknown errors        */
     if (req_prep_desc )
     {
         useroutda->sqld = 0;
     } out_da_size = SQLDASIZE(useroutda->sqld);
     retcode = sqlogblk(ddsacb->rsheap,out_da_size,&out_da);
     if ( retcode < 0 )
     {
         sqlcpsca(ca_ptr, "SQLCPREQ",(long) SQL_RC_E961);
         sqlt_trace_error(SQLT_SQLC, SQLT_SQLCPREQ, 102,
sizeof(short),&retcode);
          err_retcode |= SQLJR_RCF_SQLCA;
          goto exit;
     }
     sqlzmcpy((char *) out_da,useroutda,out_da_size);
}

/* pick up the com buffer address   */
 combuf = ddsacb->buffer;
 comra = (SQLJDSRA *) (combuf + loc);  /*Points the the RA in the com
buffer */
                              /* copy the dcsra into the com buffer */
 sqlzmcpy((char *) (combuf + loc) ,dcsra, JRASIZE);
                              /* If it is a blocked fetch, set the */
                              /* outpout da length in the com buffer*/
                              /* to be 0.                         */
 if (req_blocking)
 {
     comra->sqlrdaol = 0L;
 }
                              /* point to next position in the buf */
 loc += JRASIZE;
                              /* points the data stream length    */
                              /* structure                       */
 dslenptr = (struct sqlcplen *)(combuf + loc);
                              /* initlialize the control structure */
                              /* length                          */
 if ((in_da != 0) && (! req_compile) && (! req_runstat))
 {
    dslenptr->cs_len = JRASIZE + SQLCPLEN_SIZE(in_da->sqld);
 }
 else dslenptr->cs_len = JRASIZE + SQLCPLEN_SIZE(0);
```

```
dslenptr->in_data_len = 0;
dslenptr->out_data_len = 0;
                                 /* Ignore the input data field for  */
                                 /* compile request type             */
if (in_da != 0 && (!req_compile)&& (!req_runstat) )
{
    dslenptr->num_of_vars = in_da->sqld;
}
else
{
    dslenptr->num_of_vars = 0;
}

/* Set the number of output SQLVARs. */
if (out_da != NULL)
{
    dslenptr->num_of_out_vars = out_da->sqld;
}
else
{
    dslenptr->num_of_out_vars = 0;
} loc +=SQLCPLEN_SIZE(0);          /* points to the input sqlvar length */
                                 /* array                             */ triplet = (SQLJDATA *) &(dcsra->sqlrflgl);
                                 /* Get total jra parm length         */
                                 /* Since JRA parameters might not be */
                                 /* all in the first com buffer,we must*/
                                 /* get the parameter length before the*/
                                 /* first com buffer got sent         */
for (i=0;i < MAX_JRA_TRIPLET ;i++ )
{
                                 /* Update total JRA parameter length */
    jra_parm_len += triplet->sqlrdtl;
    triplet++;                   /* Point to the next triplet         */
}                                /* endfor                            */ dslenptr->cs_len += jra_parm_len;   /* Add total jra parameter length to */
                                 /* control sructure length           */
if (in_da != NULL)
{
                                 /* Allocate the actual length array  */
                                 /* dynamically if the static array   */
                                 /* is not large enough               */
    if (in_da->sqld > STATIC_VARS)
    {
        retcode = sqlogblk(ddsacb->rsheap,
                    sizeof(long) * in_da->sqld,
                    &act_len_in);
                                 /* Set the input DA allocation flag to*/
                                 /* indicate that input DA has been    */
                                 /* dynamically allocated              */ if ( retcode < 0 )
        {
            sqlcpsca(ca_ptr, "SQLCPREQ",(long) SQL_RC_E961);
            sqlt_trace_error(SQLT_SQLC, SQLT_SQLCPREQ, 103,
                    sizeof(short),&retcode);
            err_retcode |= SQLJR_RCF_SQLCA;
            goto exit;
        }
        alloc_flag_in++;
    }
    else                         /* else use actual length array      */
                                 /* allocated statically              */
    {
        act_len_in = &sqlvar_actlen_in F0 ;
    }                            /* endif                             */
}                                /* endif                             */

/* scan input DA to get the actual   */
                                 /* data length of each sqlvar and the*/
                                 /* total input data length           */
                                 /* If the JRA request type is compile*/
                                 /* Skip the input data               */
```

```c
                                /* If data type is nullable, add two  */
                                /* bytes to the actual data length    */
if ((in_da != NULL) && (!req_compile) && (!req_runstat))
{
    for (i=0;i < in_da->sqld ;i++ )
    {
        sqlvar = &(in_da->sqlvar[i] );

if (SQLV_IND_EXISTS(sqlvar) && (*(sqlvar->sqlind) < 0))
        {
            act_len_in[i] =0;
        }
        else
        {
            act_len_in[i]  = (unsigned long) sqlcpdls(sqlvar);
        } if ( (sqlvar->sqltype & SQL_TYP_NULINC) != 0)
        {
            dslenptr->in_data_len += SQLC_SHORT_SIZE;
        }
        dslenptr->in_data_len += act_len_in[i] ;
    }                           /* endfor                             */
}                               /* end in_da check                    */
                                /* scan output DA to get the total    */
                                /* output data length                 */
                                /* Skip this code if it is fetch and  */
                                /* and blocking                       */
if (out_da != NULL && !req_blocking)
{
    for (i=0;i < out_da->sqld ;i++ )
    {
        sqlvar = &(out_da->sqlvar[i] );
        dslenptr->out_data_len += (unsigned long) sqlcpdlr(sqlvar);
                                /* If the data type is nullable and   */
                                /* the null indicator is not null, ask*/
                                /* the server to allocate space for   */
                                /* the null indicator                 */
        if (((sqlvar->sqltype & SQL_TYP_NULINC) != 0) &&
            (sqlvar->sqlind != NULL))
        {
            dslenptr->out_data_len += SQLC_SHORT_SIZE;
        }
                                /*If the null indicator exists, set   */
                                /*the null indicator value to -1.     */
                                /*Otherwise, set the null indicator   */
                                /*to 0                                */
        if (sqlvar->sqlind == NULL)
        {
            sqlvar->sqlind = (short *) -1;
        }
        else
        {
            sqlvar->sqlind = (short *) 0;
        }
    } /* endfor */
}
                                /* all length information pointed by  */
                                /* dslenptr is set. Move length array */
                                /* into data stream                   */
                                /* If there is any communcation error */
                                /* occurs, exits                      */
if (in_da != NULL && (!req_compile) &&(! req_runstat) )
{
    err_retcode = sqlcpmd( ddsacb, &loc, (char *) act_len_in,
                    sizeof(long)*(in_da->sqld), ca_ptr);

if (err_retcode == SQLJR_RCF_TERMINATE)
    {
        goto exit;
    }
}
```

```
/************************************************************************/
/*                      Create JRA parameters data stream              */
/************************************************************************/
```

```c
                            /* points to the first JRA triplet    */
triplet = (SQLJDATA *) &(dcsra->sqlrflgl);
                            /* Loop through all the triplets       */
for (i=0;i < MAX_JRA_TRIPLET ;i++ )
{
                            /* Move JRA parmeters into data stream*/
    if (triplet->sqlrdtl > 0)
    {
        err_retcode =sqlcpmd( ddsacb,&loc,triplet->sqlrdtp,
                    (unsigned int) triplet->sqlrdtl,ca_ptr);
        if (err_retcode == SQLJR_RCF_TERMINATE)
        {
            goto exit;
        }
    }
    triplet++;
}                           /* endfor                              */
/****************************************************************/
/*          SQLJRA and parameters have been put                 */
/*              into the communication buffer.                  */
/****************************************************************/
/****************************************************************/
/*              Move the input DA into data stream              */
/****************************************************************/
if (dcsra->sqlrdapi != NULL)
{
                            /* Caculate the size of the DA        */
    da_size = SQLDASIZE(((struct sqlda *)dcsra->sqlrdapi)->sqld);
                            /* Move DA into the com buffer        */
    err_retcode = sqlcpmd(ddsacb, &loc,(char *) (dcsra->sqlrdapi),
                da_size, ca_ptr);
    if (err_retcode == SQLJR_RCF_TERMINATE)
    {
        goto exit;
    }
}                           /* End sqlrdapi check                  */

/****************************************************************/
/*              Move the output DA into data stream             */
/****************************************************************/
if ((out_da != NULL) && (!req_blocking))
{
                            /* Move DA into the com buffer        */
    err_retcode = sqlcpmd(ddsacb,&loc,(char *) out_da, out_da_size,ca_ptr);
    if (err_retcode == SQLJR_RCF_TERMINATE)
    {
        goto exit;
    }
}                           /* End sqlrdapo check                  */

/****************************************************************/
/*              Put input data into datastream.                 */
/****************************************************************/
                            /* If input data exists               */
                            /* and the JRA request type is not    */
                            /* compile or runstat                 */
if ( (in_da != NULL) && (!req_compile) && (!req_runstat))
{
    i = 0;
                            /* Loop through all the sqlvars        */
    while ((ca_ptr->sqlcode == SQL_RC_OK) && ( i < in_da->sqld) )
    {
                            /* Get the next SQLVAR.               */
        sqlvar = &(in_da->sqlvar[i] );

/* If the data type is nullable, send */
                            /* null indicator contents into the   */
                            /* datastream                         */
        if ( (sqlvar->sqltype & SQL_TYP_NULINC) != 0)
        {
            if ((sqlvar->sqlind != NULL ) && ((short) *(sqlvar->sqlind) != 0))
            {
```

```
                err_retcode = sqlcpmd(ddsacb, &loc,
                                    (char *)(in_da->sqlvar[i].sqlind),
                                    SQLC_SHORT_SIZE,ca_ptr);
            }
            else
            {
                err_retcode = sqlcpmd(ddsacb, &loc,(char *)&zero,
                                    SQLC_SHORT_SIZE,ca_ptr);
            }
            if (err_retcode == SQLJR_RCF_TERMINATE)
            {
                goto exit;
            }
        }
                                    /* Move the data into data stream    */
        if (act_len_in[i] > 0)
        {
            err_retcode = sqlcpmd(ddsacb, &loc,sqlvar->sqldata,
                            (unsigned int) act_len_in[i] ,ca_ptr);
            if (err_retcode == SQLJR_RCF_TERMINATE)
            {
                goto exit;
            }
        }
        i++;
    }                               /* endwhile                           */
}                                   /* end compile request type check     */
                                    /* Process the remaining data in the  */
                                    /* com buffer                         */
if ((ca_ptr->sqlcode == SQL_RC_OK) && (loc > SQLC_SHORT_SIZE))
{
                                    /* Store the length into the buffer   */
                                    /* byte reversed                      */
    buffer_len = SQLC_SWAP2(loc);
    sqlzmcpy(ddsacb->buffer,&buffer_len,SQLC_SHORT_SIZE);

/* Send it                            */
    retcode = sqlccsen(&ddsacb->comhandle,(short) loc,ddsacb->buffer);
    if (retcode < 0)
    {
        sqlcperc(&ddsacb->cbmhandle,ca_ptr,"SQLCPREQ");
        err_retcode |= SQLJR_RCF_TERMINATE;
        goto exit;
    }
}                                   /* End of sqlcode and loc check       */

/****************************************************************************
*/
/*                          Cleaning things up                               */
/****************************************************************************
*/
exit:
                                    /* Free tempory da                    */
if (out_da != NULL)
{
    retcode = sqlofblk(ddsacb->rsheap,out_da_size ,out_da);
                                    /* Terminate if error on free         */
    if ( retcode != 0 )
    {
        sqlcpsca(ca_ptr,"SQLCPREQ", (long) SQL_RC_E902) ;
        err_retcode |= SQLJR_RCF_SQLCA;
    }
}
                                    /* Free dynamically allocated actual  */
                                    /* length array for input DA          */
if (alloc_flag_in > 0)
{
    retcode = sqlofblk(ddsacb->rsheap, sizeof(long) * in_da->sqld,act_len_in);
                                    /* Terminate if error on free         */
    if ( retcode != 0 )
    {
        sqlcpsca(ca_ptr,"SQLCPREQ", (long) SQL_RC_E902) ;
        err_retcode |= SQLJR_RCF_SQLCA;
    }
}                                   /*End if on free block check          */

/* Free the da space allocated for    */
                                    /* run stat                           */
if (run_da != NULL)
```

```
{
  retcode = sqlofblk(ddsacb->rsheap, run_da_size, run_da);
  if ( retcode != 0 )
  {
      sqlcpsca(ca_ptr,"SQLCPREQ", (long) SQL_RC_E902) ;
      err_retcode |= SQLJR_RCF_SQLCA;
  }
} return(err_retcode);
}
```

```
/******************************-PROLOGUE-******************************
**
*                                                                      *
* Function name:    sqlcp_get_maxmem                                    *
*                                                                      *
* Function:                                                             *
*     This function returns the maximum size data area required for a   *
*     sqlda;                                                            *
* Input:                                                                *
*     Pointer to the ACB                                                *
*     Pointer to the sqlra                                              *
*                                                                      *
* Output:                                                               *
*     The SQL request processed.                                        *
*                                                                      *
* Return Code:                                                          *
*     see sqlrrdi return codes                                          *
***************************-END PROLOGUE-***************************/
/*                        BEGIN (INVOKE RDS TO PROCESS SQL REQUEST) */ unsigned int sqlcp_get_maxmem( struct sqlda *sqlda)

{
  int i;
  unsigned int memsize;
  unsigned int maxsize;

/* will contain largest size sqlvar */
  maxsize = 0;
                            /* Whiledo more sqlvars and no errors */
  for (i = 0; i < sqlda->sqln; i++)
  {
                            /* get memory for new data area       */
      memsize = sqlcpdlr(&sqlda->sqlvar[i] );
      if(maxsize < memsize)
      {
          maxsize = memsize;
      }
  } /* end for loop */
  return(maxsize);
}
```

```
/******************************-PROLOGUE-******************************
**
*                                                                      *
* Function name:    sqlcp_create_close                                  *
*                                                                      *
* Function:         Requester Close Cursor                              *
*     This function build a close cursor sqljra                         *
* Input:                                                                *
*     Pointer to the ACB                                                *
*     Pointer to the sqlra                                              *
*                                                                      *
* Output:                                                               *
*     The SQL request processed.                                        *
*                                                                      *
* Return Code:                                                          *
*     see sqlrrdi return codes                                          *
***************************-END PROLOGUE-***************************/ int SQLZ_LOCAL sqlcp_create_close( SQLJDSRA *newjra, SQLJDSRA *desra)
```

```c
{
  int retcode = 0;
                              /* Initialize close cursor sqljra    */
  sqlzmset ( newjra, '\0', SQLJ_LEN_SQLJDSRA );
  strcpy ( newjra->sqlraid, SQLJRA_TTL );
  newjra->sqlrabc = SQLJ_LEN_SQLJDSRA;
  newjra->sqlrelno = SQLJ_RELNO;
  newjra->sqltype = SQLJ_DBSV;
  newjra->sqlrdnum = SQLJDSRA_DATA_ITEMS;
  newjra->sqlrtype = SQLJR_CLOSE;
                              /* SQLCA                              */ newjra->sqlrcal = dcsra->sqlrcal;
  newjra->sqlrcat = dcsra->sqlrcat;
  newjra->sqlrcap = dcsra->sqlrcap;
                              /* PACKAGE NAME                       */
  newjra->sqlrpgml = dcsra->sqlrpgml;
  newjra->sqlrpgmt = dcsra->sqlrpgmt;
  newjra->sqlrpgmn = dcsra->sqlrpgmn;
                              /* CREATOR NAME                       */ newjra->sqlrcrel = dcsra->sqlrcrel;
  newjra->sqlrcret = dcsra->sqlrcret;
  newjra->sqlrcrea = dcsra->sqlrcrea;
                              /* CONSISTENCY TOKEN                  */
  newjra->sqlrctkl = dcsra->sqlrctkl;
  newjra->sqlrctkt = dcsra->sqlrctkt;
  newjra->sqlrctkp = dcsra->sqlrctkp;
                              /* SECTION NUMBER                     */
  newjra->sqlrsctl = dcsra->sqlrsctl;
  newjra->sqlrsctt = dcsra->sqlrsctt;
  newjra->sqlrsect = dcsra->sqlrsect;

/* Initialize the ca                  */
  return(retcode);
}

/****************************************************************************/
/* Function name: SQLCP_GET_CA_RETCODE                                      */
/* Function:                                                                 */
/*       Receive DDS return code and SQLCA from communication buffer        */
/* Input:                                                                    */
/*       SQLCA pointer                                                       */
/*       Communcation buffer pointer                                         */
/*       Current buffer position                                             */
/* Output:                                                                   */
/*       SQLCA  and DDS return code                                          */
/****************************************************************************/
void SQLZ_LOCAL sqlcp_get_ca_retcode(struct sqlca *sqlca,
                                     short *ddsretcode,
                                     char *combuf,
                                     int *buf_loc)

{
  int loc;
  signed char *ca_null_ind;      /* CA null indicator                  */ loc = *buf_loc;
                                 /* Get DDS retrun code                */
  sqlzmcpy(ddsretcode,combuf+loc,SQLC_SHORT_SIZE);
  loc += SQLC_SHORT_SIZE;

ca_null_ind = &(combuf[loc]);
  loc += SQLC_CHAR_SIZE;         /* Pick up the location of the CA     */
                                 /* If there is no CA in the com buffer*/
                                 /* , we assume that the operation is  */
                                 /* executed successfully              */
                                 /* If there is a CA in the com buffer */
                                 /* Copy it into requestor's CA        */
                                 /* Else clear SQLCODE to zero         */
  if (*ca_null_ind != (signed char) ONEBYTENULL)
  {
                                 /* Save CA                            */
```

```c
        sqlzmcpy(sqlca, &combuf[loc] , sizeof(struct sqlca));
                                        /* Point to output data in the buffer */
        loc += sizeof(struct sqlca);
    }
    else
    {
        sqlca->sqlcode = 0;
        sqlzmset(sqlca->sqlstate,'0',5);
                                        /* Copy the signature field from the */
                                        /* acb                               */
        sqlzmcpy(sqlca->sqlerrp,sqleglob.acb->sqlerrp,8);
    }

*buf_loc = loc;
}                               /* END sqlcp_get_ca_retcode           */

/*****************************************************************************
*/
/* Function name: SQLCP_GET_DATA
*/
/* Function:                                                                 */
/*      Receive data into user DA, if cursor control block pointer is not    */
/*      null, then receive data into the native DA and then do appropriate   */
/*      conversions.                                                         */
/* Input:                                                                    */
/*      User ouput SQLDA pointer                                             */
/*      CCB pointer (NULL for non fetch operations)                          */
/*      Communcation buffer pointer                                          */
/*      Current buffer position                                              */
/* Output:                                                                   */
/*      Updated ouptut user SQLDA                                            */
/*****************************************************************************
*/
int SQLZ_LOCAL sqlcp_get_data(struct sqlcacb *ddsacb,
                              struct sqlda *userda,
                              struct sqlcp_ccb *ccb,
                              char *combuf,
                              int *buf_loc,
                              struct sqlca *sqlca)

{
    int loc;
    signed char *row_null_ind;   /* row null indicator              */
    struct sqlvar *sqlvar;       /* da var pointer                  */
    short col_null_ind;          /* column null indicator           */
    int copyto = 0;
    unsigned short i;            /* loop counter                    */
    unsigned short data_rem;     /* length of data remained to be   */
                                 /* copied                          */
    short is_error = 0;          /* Is there an error?              */
    struct sqlca err_ca;         /* SQLCA of error.                 */
    int retcode = 0;
    int err_retcode = 0;
    char *source;
    union
    {
        unsigned short len;
        unsigned char ch_len[2] ;
    };                           /* Variable to convert one byte length */
    struct SQLRXNLS sqlcnlwa;    /* NLS work area
*/
    struct sqlda *sqlda;
/*NEW*/
    unsigned int max_data_len;   /* Maximum data Length
*/
/*NEW*/

/* If it is a fetch cursor operation, */
                                 /* initialize the NLS work area       */
                                 /* Else set up the user DA.           */
    if (ccb != NULL)
    {
        sqlcnlwa.cntry_page.codepage = ddsacb->cb.acb.acbptr->doscodepg;
        sqlcnlwa.null_term = SQLV_TRUNC_NULL;
        sqlda = ccb->native_da;
        if (userda->sqld != sqlda->sqld)
        {
            sqlca->sqlwarn[SQL_WARN_MISM] = SQL_WARNING;
```

```
        sqlca->sqlwarn[SQL_WARN_ANY   = SQL_WARNING;
   }

}
else
{
   sqlda = userda;
} loc = *buf_loc;
                                       /* Pick up the row null indicator    */
row_null_ind = &(combuf[loc]);
loc += SQLC_CHAR_SIZE;                 /* Points to the output data
*/
                                       /* If there is no output DA or no data*/
                                       /* is available, exit                */
if ((sqlda == NULL) || (*row_null_ind == (signed char) ONEBYTENULL ))
goto exit;
                                       /* Get sqlvar data                   */
for (i = 0;i < sqlda->sqld ;i++ )
{
                                       /* point to the current sqlvar       */
   sqlvar = &(sqlda->sqlvar[i]);

if (ccb != NULL)
   {
      sqlvar->sqldata = ccb->data_area;
   }

/* If the data type is nullable      */
   if ((sqlvar->sqltype & SQL_TYP_NULINC) != 0)
   {
                                       /* Get the col null indicator in     */
      source = combuf + loc;
      retcode = sqlcpgd(ddsacb,&source,combuf, (char *) &col_null_ind,
                   SQLC_SHORT_SIZE,FALSE);
      if (retcode < 0)
      {
         sqlcperc(&ddsacb->comhandle,sqlca,"SQLCPREQ");
         err_retcode |= SQLJR_RCF_TERMINATE;
         goto exit;
      }
      loc = source - combuf;

/* If there is a null indicator...   */
                                       /* If blocking...                    */
                                       /*   set the native DA null ind ptr  */
                                       /*   to the null indicator.          */
                                       /* Else, copy the null ind to the    */
                                       /*   user DA null indicator area.    */
      if (sqlvar->sqlind != NULL)
      {
         if  (ccb != NULL)
         {
             sqlvar->sqlind = &col_null_ind;
         }
         else
         {
            *sqlvar->sqlind = col_null_ind;
/*          sqlzmcpy(sqlvar->sqlind, &col_null_ind, SQLC_SHORT_SIZE); */
         }
      }

/* If NULL indicator is on, no data. */
      if (col_null_ind < 0)
      {
         goto cont;
      }
   }
   copyto = 0;
                                       /* Calcuate the actual data length   */
                                       /* For VARCHAR and LSTR, data length
*/
                                       /* is stored in the first one or two */
                                       /* bytes in the data, get the actual */
                                       /* data length, then call the        */
                                       /* receiving routine to get the data. */
                                       /* For CSTR, the receiving routine   */
```

```
                                    /* will try to find the null termin- */
                                    /* ator in the data, otherwise use the*/
                                    /* maximum data length stored in sql- */
                                    /* var                                 */
    switch (sqlvar->sqltype & 0xfffe)
    {
      case SQL_TYP_LSTR:
          source = combuf + loc;
          l.len = 0;
          retcode = sqlcpgd(ddsacb,&source,combuf, l.ch_len,1,FALSE);
          if (retcode < 0)
          {
              sqlcperc(&ddsacb->comhandle,sqlca,"SQLCPREQ");
              err_retcode |= SQLJR_RCF_TERMINATE;
              goto exit;
          }
          data_rem = l.len;
          sqlzmcpy(sqlvar->sqldata,l.ch_len,SQLC_CHAR_SIZE);
          copyto = SQLC_CHAR_SIZE;
          loc = source - combuf;
/*NEW*/
          max_data_len = sqlvar->sqllen;
/*NEW*/
          break;

case SQL_TYP_LONG:
      case SQL_TYP_VARCHAR:
          source = combuf + loc;
          retcode = sqlcpgd(ddsacb,&source,combuf, (char *)&data_rem,
                      SQLC_SHORT_SIZE,FALSE);
          if (retcode < 0)
          {
              sqlcperc(&ddsacb->comhandle,sqlca,"SQLCPREQ");
              err_retcode |= SQLJR_RCF_TERMINATE;
              goto exit;
          }
          sqlzmcpy(sqlvar->sqldata,(char *)&data_rem,SQLC_SHORT_SIZE);
          copyto = SQLC_SHORT_SIZE;
          loc= source - combuf;
/*NEW*/
          max_data_len = sqlvar->sqllen;
/*NEW*/
          break;
      case SQL_TYP_VARGRAPH:
      case SQL_TYP_LONGRAPH:
          source = combuf + loc;
          retcode = sqlcpgd(ddsacb,&source,combuf, (char *)&data_rem,
                      SQLC_SHORT_SIZE,FALSE);
          sqlzmcpy(sqlvar->sqldata,(char *)&data_rem,SQLC_SHORT_SIZE);
          data_rem *= 2;
          if (retcode < 0)
          {
              sqlcperc(&ddsacb->comhandle,sqlca,"SQLCPREQ");
              err_retcode |= SQLJR_RCF_TERMINATE;
              goto exit;
          }
          copyto = SQLC_SHORT_SIZE;
          loc= source - combuf;
/*NEW*/
          max_data_len = sqlvar->sqllen * 2;
/*NEW*/
          break;
      default:
          data_rem = (unsigned short) sqlcpdlr(sqlvar);
          max_data_len = data_rem;
    }
                                    /* If the  data_rem is greater than    */
                                    /* the maximum data length, set        */
                                    /* data_rem to be maximum data length  */
                                    /* and issued a -804 error message     */
/*NEW*/
    if (data_rem > max_data_len)
    {
        data_rem = max_data_len;
        sqlcpsca(sqlca, "SQLCPREQ",(long) SQL_RC_E804);
        err_retcode |= SQLJR_RCF_SQLCA;
    }
/*NEW*/
```

```c
                                        /* Get the actual data in          */
        source = combuf + loc;
        if ((sqlvar->sqltype & 0xfffe) == SQL_TYP_CSTR)
        {
            retcode = sqlcpgd(ddsacb,&source, combuf, sqlvar->sqldata + copyto,
                        data_rem,TRUE);
            if (retcode < 0)
            {
                sqlcperc(&ddsacb->comhandle,sqlca,"SQLCPREQ");
                err_retcode |= SQLJR_RCF_TERMINATE;
                goto exit;
            }
        }
        else
        {
            retcode = sqlcpgd(ddsacb,&source, combuf,
                        sqlvar->sqldata + copyto,data_rem,FALSE);
            if (retcode < 0)
            {
                sqlcperc(&ddsacb->comhandle,sqlca,"SQLCPREQ");
                err_retcode |= SQLJR_RCF_TERMINATE;
                goto exit;
            }
        }
        loc = source - combuf;

cont: ;
                                    /* If it is a fetch operation, trans- */
                                    /* late data in the work area into    */
                                    /* user data area                     */
                                    /* Check if the user has allocated    */
                                    /* vars                               */
        if ((ccb != NULL) && (i < userda->sqld))
        {
            sqlrxext(&sqlcnlwa,&sqlda->sqlvar[i] ,&userda->sqlvar[i] ,sqlca);
        }

/* If there's an error,               */
                                    /* Mark it, and save the sqlca.       */
        if (sqlca->sqlcode != 0)
        {
            is_error = 1;
            sqlzmcpy(&err_ca, sqlca, sizeof(struct sqlca));
        }

}                               /* end for                            */
exit:

/* If there was an error, restore the */
                                    /* SQLCA...                           */
    if (is_error)
    {
        sqlzmcpy(sqlca, &err_ca, sizeof(struct sqlca));
    }

/* Done...                            */
    *buf_loc = loc;
                                    /* Return positive return code        */
    return(err_retcode);
}                                   /* END SQLCP_GET_DATA                 */
/****************************************************************************
*/
/* Function name: SQLCPRRV                                                 */
/* Function:                                                               */
/*      Receive output data from the server                                */
/* Input:                                                                  */
/*      DDSACB pointer                                                     */
/*      DCSRA pointer                                                      */
/*      Output CFDA pointer                                                */
/* Output:                                                                 */
/*      SQLCA and SQLDA pointed by DCSRA
*/
/****************************************************************************
*/
int SQLZ_LOCAL sqlcprrv (struct sqlcacb *ddsacb,SQLJDSRA *dcsra)

{
    int loc;                /* Com buffer pointer                         */
```

```
int var_index = 0;          /* Sqlvar pointer                              */
int copyto = 0;             /* Point to the next available slot in com     */
                            /* buffer.                                     */
unsigned short buf_len;     /* Length of the com buffer                    */
short nullflag =0;          /* Null indicator processing flag              */
char *combuf;               /* Com buffer pointer                          */
unsigned short length_found=0; /* Flag to indicate the data length stored in */
                            /* the data has been retrieved                 */
struct sqlda *sqlda;        /* Output DA pointer                           */
char *source;
                            /*                                             */
                            /* Variable definitions for start using        */
                            /*                                             */
char *dbname;               /* server DB name                              */
short *server_cp;           /* server code page                            */
short *server_pid;          /* server pid                                  */
short *server_tid;          /* server thread id                            */
char *server_rlevel;        /* server release level                        */
struct sqlda *native_da;    /* native da for open cursor                   */
struct sqlda *ret_native_da; /* a full native da returned to the caller    */
short num_vars;             /* number of sqlvars                           */
unsigned int native_da_size; /* size of the native sqlda                   */
unsigned short max_mem;     /* maximum memory for sqlvars
*/
SQLJACB *dcsacb;            /* DCS acb pointer                             */
short ddsretcode= 0;        /* DDS return code                             */
short buffer_len;           /* Buffer length                               */
int retcode = 0;            /* Return code                                 */
int err_retcode = 0;        /* Positive return code                        */
short terminator;           /* Terminator for cursor operations            */
unsigned long *buf_size;    /* Buffer size used for start gateway          */
SQLJDSRA newjra;            /* JRA for request generated for error
*/
                            /* handling                                    */
short i;                    /* loop counter                                */
short da_null;              /* flag indicates whehter there is an output   */
                            /* da in the com buffer                        */
unsigned short sqlvar_space; /* space for each sqlvar                      */

/***************************************************************************/
/* The requestor expects the following data in the com buffer from the server*/
/* ---------------------------------------              */
/* |11| ca_null_ind | SQLCA | row_null_ind | Data |              */
/* ---------------------------------------              */
/* ca_null_ind:                                                              */
/* Function: to indicate whether there is a CA followed.                     */
/* Length: 1 byte                                                            */
/*                                                                           */
/* row_null_ind:                                                             */
/* Function: to indicate whether there is data followed.                     */
/* Length: 1 byte                                                            */
/***************************************************************************/

/* Pick up the output DA pointer               */
sqlda = (struct sqlda *)dcsra->sqlrdapo;

/* Pick up the CA pointer                      */
sqlca = (struct sqlca *)dcsra->sqlrcap;

buf_len = ddsacb->length;
                            /* Pick up the com buffer address              */
if ((req_fetch || req_open_cursor) && (ccbptr != NULL)
    && (ccbptr->curs_status == SQLCP_OPEN_BLOCK))
{
    combuf = ccbptr->buffer;
}
else
{
    combuf = ddsacb->buffer;
}

/* Receive the first block                     */
retcode = sqlccrcv(&(ddsacb->comhandle),&buf_len, combuf,SQLC_FILL);
                            /* Exit if the receive is not                  */
                            /* successful                                  */
if (retcode < 0)
{
    sqlcperc(&ddsacb->comhandle,sqlca,"SQLCPREQ");
```

```
      err_retcode = SQLJR_RCF_TERMINATE;
      goto exit;
}
                                    /* Get amount of data in buffer    */
sqlzmcpy(&buffer_len, combuf, SQLC_SHORT_SIZE);
buffer_len = SQLC_SWAP2(buffer_len);
loc = SQLC_SHORT_SIZE;

/* If it is fetch and blocking, recive */
                                    /* number of rows and terminator from  */
                                    /* the com buffer                      */ if (req_blocking)
{
   sqlzmcpy(&ccbptr->num_rows,combuf+loc,SQLC_SHORT_SIZE);
   loc += SQLC_SHORT_SIZE;
   sqlzmcpy(&terminator,combuf+loc,SQLC_SHORT_SIZE);
   loc += SQLC_SHORT_SIZE;
   ccbptr->num_rows_fetched = 0;
}

/* Get DDS return code and CA      */
sqlcp_get_ca_retcode(sqlca,&ddsretcode,combuf,&loc);

/* If it is execute, and the user    */
                                    /* request output DA, receive the da */
                                    /* null indicator. If output DA       */
                                    /* in the data stream, allocate       */
                                    /* a output SQLDA. Otherwise, flag an*/
                                    /* error and exit                     */
if (req_exec && (dcsra->sqlrflag FSQLJ_CSRDA_OFF   == SQLJ_OUTSQLDA))
{
   sqlzmcpy(&da_null,combuf+loc,SQLC_SHORT_SIZE);
   loc += SQLC_SHORT_SIZE;
   if ( da_null < 0 )
   {
       goto exit;
   }
                                    /* Receive number of vars from com buf */
   sqlzmcpy(&num_vars,combuf+loc,SQLC_SHORT_SIZE);
   loc += SQLC_SHORT_SIZE;
                                    /* Allocate native outpout da       */
   native_da_size = SQLDASIZE(num_vars);
   retcode = sqlogblk(ddsacb->rsheap, native_da_size, &native_da);
   if (retcode != 0)
   {
       sqlt_trace_error(SQLT_SQLC, SQLT_SQLCPREQ, 121,
                    sizeof(short),&retcode);
       sqlcpsca(sqlca, "SQLCPREQ",(long) SQL_RC_E961);
       err_retcode |= SQLJR_RCF_SQLCA;
       goto exit;
   }
   source = combuf + loc;
                                    /* Get native da from com buffer    */
   retcode = sqlcpgd(ddsacb,&source,combuf, (char *)native_da,
                native_da_size,FALSE);
                                    /* Allocate space for SQLVARs       */
   for (i = 0; (i < native_da->sqln) && (retcode == 0); i++)
   {
       sqlvar_space = sqlcpdlr(&native_da->sqlvar Fi );
       if ((native_da->sqlvar Fi .sqltype & SQL_TYP_NULINC) != 0)
       {
          sqlvar_space += SQLC_SHORT_SIZE;
          retcode = sqlogblk(ddsacb->rsheap,
                       sqlvar_space,
                       &native_da->sqlvar Fi .sqldata);
          native_da->sqlvar Fi .sqlind =
                       (short*)native_da->sqlvar Fi .sqldata;
          native_da->sqlvar Fi .sqldata += 2;
       }
       else
       {
          retcode = sqlogblk(ddsacb->rsheap,
                       sqlvar_space,
                       &native_da->sqlvar Fi .sqldata);
       }
   }
```

```
        if ( retcode < 0 )
        {
            sqlcpsca(sqlca, "SQLCPREQ",(long) SQL_RC_E961);
            sqlt_trace_error(SQLT_SQLC, SQLT_SQLCPREQ, 106,
sizeof(short),&retcode);
            err_retcode |= SQLJR_RCF_SQLCA;
            goto exit;
        }
        dcsra->sqlrdapo = (void *) native_da;
        sqlda = native_da;

loc = source - combuf;

}

/* If it is prepare, describe,or open*/
                                    /* curosr, recieve the output da null*/
                                    /* indicator                         */
    if (req_prep_desc || req_open_cursor)
    {
      sqlzmcpy(&da_null,combuf+loc,SQLC_SHORT_SIZE);
      loc += SQLC_SHORT_SIZE;
    }

/* If SQLCODE is less than 0, ignore */
                                    /* the rest of the com buffer        */
                                    /* Delete the cursor control block if*/
                                    /* SQLCODE is less than 0            */
    if (sqlca->sqlcode < 0)
    {
        if (req_open_cursor && (ccbptr != NULL) )
        {
            retcode = sqlcpdcb(ddsacb, &req_ccbs, ccbptr, TRUE);
        }
        goto exit;
    }

/*If it is a fetch and sqlcode is 100*/
                                    /*skip the rest of the data          */
    if (req_fetch && (sqlca->sqlcode == SQL_RC_W100))
    {
        if (ccbptr != NULL)
        {
            ccbptr->curs_status = SQLCP_NO_DATA;
        }
        goto exit;
    }

/* Frees up DDS control block if the */
                                    /* dds return code says commit or    */
                                    /* rollback                          */
                                    /* Delete nonhold cursors when       */
                                    /* commit performed. Delete all cursors*/
                                    /* when rollback performed.          */
    if (ddsretcode & SQLJR_RCF_COMMIT)
    {
        sqlcpdac(ddsacb, &req_ccbs, SQLC_CSRT_NOHOLD,TRUE);
    }
    else if (ddsretcode & SQLJR_RCF_ROLLBACK)
    {
        sqlcpdac(ddsacb, &req_ccbs, SQLC_CSRT_ALL, TRUE);
    }

/*If the JRA request type is start   */
                                    /*using, get all JRA parameters out  */
                                    /*from com buffer one at a time      */
    if (req_startusing)
    {
      dcsacb = (SQLJACB *)ddsacb->cb.acb.dcsacb;

dbname = &combuf[loc] ;
      sqlzmcpy(ddsacb->cb.acb.dbname,dbname,10);
      loc += 10;

server_cp= (short *)&combuf[loc] ;
      sqlzmcpy(&(dcsacb->sqldbcpg),server_cp,SQLC_SHORT_SIZE);
      loc += SQLC_SHORT_SIZE;
```

```c
                                /* Get server buffer size       */
buf_size = (unsigned long *)dcsra->sqlrdata[SQLJ_BSZ_OFF] .sqlrdtp;
*buf_size = (unsigned short)(*(short *)&combuf[loc] );

loc += SQLC_SHORT_SIZE;
                                /* Get the server process id    */
server_pid= (short *)&combuf[loc] ;
                                /* Save server process id into RCIB  */
                                /* for handling interrupt       */
sqlzmcpy(ddsacb->cb.acb.rcibptr->agprocid,
        (char *)server_pid,SQLC_SHORT_SIZE);

sqlzmcpy(&(dcsacb->sqlappid),
        ,(char *)server_pid,SQLC_SHORT_SIZE);
loc += SQLC_SHORT_SIZE;
                                /* Get the server thread id     */
server_tid = (short *)&combuf[loc] ;
sqlzmcpy(&(dcsacb->sqlaptid),
        ,(char *)server_tid,SQLC_SHORT_SIZE);
loc += SQLC_SHORT_SIZE;

server_rlevel = &combuf[loc] ;
goto exit;
}

/* If the JRA request type is open  */
                                /* cursor and the return code coming*/
                                /* back from the server saying that */
                                /* the cursor can be blocked, try   */
                                /* to receive the native da from the*/
                                /* com buffer and allocate space for*/
                                /* the largest sqlvars              */
                                /* If the cursor can not be blocked,*/
                                /* the cursor control block is freed*/
                                /* Set the cusor control block type */
if (req_open_cursor)
{
    if (ddsretcode & SQLJR_RCF_HOLD)
    {
        if (ccbptr != NULL)
        {
            ccbptr->curs_type= SQLC_CSRT_HOLD;
        }
    }
                                /*If the server sent a DA over    */
    if (da_null >= 0)
    {
        sqlzmcpy(&num_vars,combuf+loc,SQLC_SHORT_SIZE);
        loc += SQLC_SHORT_SIZE;
        native_da_size = SQLDASIZE(num_vars);
        retcode = sqlogblk(ddsacb->rsheap, native_da_size, &native_da);
        if (retcode != 0)
        {
            sqlt_trace_error(SQLT_SQLC, SQLT_SQLCPREQ, 104,
                        sizeof(short),&retcode);
            sqlcpsca(sqlca, "SQLCPREQ",(long) SQL_RC_E961);
            err_retcode |= SQLJR_RCF_SQLCA;
            goto exit;
        }
        if (ccbptr != NULL)
        {
            ccbptr->native_da= native_da;
        }
        source = combuf + loc;
        retcode = sqlcpgd(ddsacb,&source,combuf, (char *)native_da,
                    native_da_size,FALSE);
        if (retcode < 0)
        {
            sqlcperc(&ddsacb->comhandle,sqlca,"SQLCPREQ");
            err_retcode |= SQLJR_RCF_TERMINATE;
            goto exit;
        }
                                /*If the caller requests for output */
                                /*native DA, allocate a full native  */
                                /*DA and return it back to the      */
                                /*caller                            */
        if (dcsra->sqlrflag[SQLJ_CSRDA_OFF]  == SQLJ_OUTSQLDA)
        {
            retcode = sqlogblk(ddsacb->rsheap, native_da_size, &ret_native_da);
```

```
        if (retcode != 0)
        {
            sqlt_trace_error(SQLT_SQLC, SQLT_SQLCPREQ, 105,
sizeof(short),&retcode);
        }
        else
        {
            sqlzmcpy(ret_native_da,native_da,native_da_size);
            for (i = 0; (i < native_da->sqln) && (retcode == 0); i++)
            {
                sqlvar_space = sqlcpdlr(&ret_native_da->sqlvar[i]);
                if ((ret_native_da->sqlvar[i].sqltype & SQL_TYP_NULINC) != 0)
                {
                    sqlvar_space += SQLC_SHORT_SIZE;
                    retcode = sqlogblk(ddsacb->rsheap,
                                       sqlvar_space,
                                       &ret_native_da->sqlvar[i].sqldata);
                    ret_native_da->sqlvar[i].sqlind =
                                (short*)ret_native_da->sqlvar[i].sqldata;
                    ret_native_da->sqlvar[i].sqldata += 2;
                }
                else
                {
                    retcode = sqlogblk(ddsacb->rsheap,
                                       sqlvar_space,
                                       &ret_native_da->sqlvar[i].sqldata);
                }
            }
        }
        if ( retcode < 0 )
        {
            sqlcpsca(sqlca, "SQLCPREQ",(long) SQL_RC_E961);
            sqlt_trace_error(SQLT_SQLC, SQLT_SQLCPREQ, 106,
sizeof(short),&retcode);
            err_retcode |= SQLJR_RCF_SQLCA;
            goto exit;
        }
        dcsra->sqlrdapo = (void *) ret_native_da;
    } loc = source - combuf;
}
                                /*If the dds return code indicates  */
                                /*blocking, receive number of rows  */
                                /*from the com buffer and set the   */
                                /*cursor contol block status to block*/
if ((ddsretcode & SQLJR_RCF_BLOCK) && (ccbptr != NULL))
{
    ccbptr->curs_status = SQLCP_OPEN_BLOCK;
                        /* Get number of rows into ccb      */
    sqlzmcpy(&ccbptr->num_rows,combuf+loc,SQLC_SHORT_SIZE);
    loc += SQLC_SHORT_SIZE;
    sqlzmcpy(&terminator,combuf+loc,SQLC_SHORT_SIZE);
    loc += SQLC_SHORT_SIZE;
    ccbptr->num_rows_fetched = 0;
    max_mem = sqlcp_get_maxmem(native_da);
    retcode = sqlogblk(ddsacb->rsheap,max_mem, &ccbptr->data_area);
    if (retcode == 0)
    {
        ccbptr->data_area_len = max_mem;
        ccbptr->buf_pos = loc;
    }

/* Create a JRA to ask the server  */
                                /* to close the cursor             */
                                /* Then send a JRA request to reopen*/
                                /* the cursor with no blocking     */
    if (retcode != 0)
    {
        sqlt_trace_error(SQLT_SQLC, SQLT_SQLCPREQ, 107,
sizeof(short),&retcode);
        sqlcp_create_close(&newjra,dcsra);
        ccbptr = NULL;
        req_open_cursor = 0;
        req_close_cursor = 1;
        retcode = sqlcpsnd(ddsacb,&newjra);
                                /* If the close cursor is successful,*/
                                /* reopen it with blocking option off*/
```

```
            if (retcode == 0)
            {
                                        /* Receive the response              */
                buf_len = ddsacb->length;
                retcode = sqlccrcv(&(ddsacb->comhandle),&buf_len,
                            combuf,SQLC_FILL);
                                        /*Exit if the receive if the receive is*/
                                        /*unsuccessful                       */
                if (retcode < 0)
                {
                    sqlcperc(&ddsacb->comhandle,sqlca,"SQLCPREQ");
                    err_retcode = SQLJR_RCF_TERMINATE;
                    goto exit;
                }
                                        /* Get amount of data in buffer      */
                sqlzmcpy(&buffer_len, combuf, SQLC_SHORT_SIZE);
                buffer_len = SQLC_SWAP2(buffer_len);
                loc = SQLC_SHORT_SIZE;
                sqlcp_get_ca_retcode(sqlca,&ddsretcode,combuf,&loc);
                                        /*Delete the cursor control block    */
                if (ccbptr != NULL)
                {
                    retcode = sqlcpdcb(ddsacb, &req_ccbs, ccbptr, TRUE);
                }

}                           /*If the close cursor is successful, */
                                        /*then reopen it without blocking    */
            if (sqlca->sqlcode >= 0)
            {
                ccbptr = NULL;
                req_open_cursor = 1;
                req_close_cursor = 0;
                ask_no_blocking = TRUE;
                retcode = sqlcpsnd(ddsacb,dcsra);
                if (retcode == 0)
                {
                                        /* Receive the response              */
                    buf_len = ddsacb->length;
                    retcode = sqlccrcv(&(ddsacb->comhandle),&buf_len,
                                combuf,SQLC_FILL);
                                        /*Exit if the receive if the receive is*/
                                        /*unsuccessful                       */
                    if (retcode < 0)
                    {
                        sqlcperc(&ddsacb->comhandle,sqlca,"SQLCPREQ");
                        err_retcode = SQLJR_RCF_TERMINATE;
                        goto exit;
                    }
                    sqlzmcpy(&buffer_len, combuf, SQLC_SHORT_SIZE);
                    buffer_len = SQLC_SWAP2(buffer_len);
                    loc = SQLC_SHORT_SIZE;
                    sqlcp_get_ca_retcode(sqlca,&ddsretcode,combuf,&loc);
                                        /*Delete the cursor control block    */
                    if (ccbptr != NULL)
                    {
                        retcode = sqlcpdcb(ddsacb, &req_ccbs, ccbptr, TRUE);
                    }
                }
                else
                {
                    err_retcode |= retcode;
                }
            }
        }
    }
    else
    {
                                        /*If the dds return code indicates no */
                                        /*blocking, free the cursor control   */
                                        /*block                               */
        if (ccbptr != NULL)
        {
            retcode = sqlcpdcb(ddsacb, &req_ccbs, ccbptr, TRUE);
        }
    }
    goto exit;
}
```

```c
                                /* If the JRA request is prepare or  */
                                /* describe, check the SQLD in the   */
                                /* com buffer, if SQLD is greater    */
                                /* than the SQLN in the output DA, no*/
                                /* DA in the com buffer, otherwise,  */
                                /* receive the DA in the com buffer  */ if (req_prep_desc)
{
 if (sqlda != NULL)
 {
    sqlzmcpy(&(sqlda->sqld),combuf+loc,SQLC_SHORT_SIZE);
    loc += SQLC_SHORT_SIZE;
    if (sqlda->sqld <= sqlda->sqln)
    {
        source = combuf+loc;
        retcode = sqlcpgd(ddsacb,&source,combuf, (char *)sqlda
                    ,SQLDASIZE(sqlda->sqld),FALSE);
        if (retcode < 0)
        {
            sqlcperc(&ddsacb->comhandle,sqlca,"SQLCPREQ");
            err_retcode |= SQLJR_RCF_TERMINATE;
            goto exit;
        }
    }
 }
    goto exit;
}

/*If it is fetch and blocking, get     */
                            /*data into the user da, update        */
                            /*number of rows fetched and com buf */
                            /*pointer                              */
                            /* Otherwise, receive data into user   */
                            /* SQLDA.                              */
if ( req_blocking && (sqlda != NULL))
{
    sqlcp_get_data(ddsacb,sqlda,ccbptr,combuf,&loc,sqlca);
    ccbptr->num_rows_fetched++;
    ccbptr->buf_pos = loc;
}
else if (sqlda != NULL)
{
    sqlcp_get_data(ddsacb,sqlda,NULL,combuf,&loc,sqlca);
} exit:
/*                      Done...                                  */
    return(err_retcode | ddsretcode);

}

/****************************************************************/
/* SQLCPREQ:                                                    */
/*    Function: Main requestor routine to send a remote request */
/*    Input:                                                    */
/*        Pointer to ddsacb                                     */
/*        Pointer to dcsra                                      */
/*    Output:                                                   */
/*        Return code of status of operation                    */
/****************************************************************/ int SQLZ_DYNLINK sqlcpreq (SQLJACB *dcsacb,
                    struct sqlcacb *ddsacb,
                    SQLJDSRA *dcsra)
{
  short retcode = 0;
  short ddsretcode;
  struct sqlda *sqlda;
  unsigned short outdasize ='0;

sqlt_perf_entry(SQLT_SQLC, SQLT_SQLCPREQ, 1, 0, NULL);
  sqlt_fnc_entry(SQLT_SQLC, SQLT_SQLCPREQ);

/* Initialize golbal variables    */
  req_compile = 0;
```

```
req_runstat = 0;
req_open_cursor = 0;
req_fetch = 0;
req_close_cursor = 0;
req_startusing = 0;
req_prep_desc = 0;
req_ari = 0;
req_blocking = 0;
req_exec = 0;
ccbptr = NULL;
sqlca = (struct sqlca *)dcsra->sqlrcap;
sqlda = (struct sqlda *)dcsra->sqlrdapo;
ask_no_blocking = 0;
                              /*Recalculate the output da size     */
if (sqlda != NULL)
{
   outdasize = (unsigned short) SQLDASIZE(sqlda->sqln);
   dcsra->sqlrdaol = (unsigned long) outdasize;
}

/* Find out what the JRA request type */
                              /* is.                                */ switch(dcsra->sqltype)
{
  case SQLJ_DCSSV:switch (dcsra->sqlrtype)
              {
                              /* Initialize cursor control block    */
                              /* during start using database        */
                  case SQLJR_STARTGW:
                       req_startusing = 1;
                       req_ccbs = NULL;
                       if (ddsacb->length > SQLC_SIZE_MAXQRYBLK)
                       {
                            ddsacb->length = SQLC_SIZE_MAXQRYBLK;
                       }
                       break;
                              /* Free all cursor control blocks     */
                              /* during stop using database         */
                  case SQLJR_STOPGW:
                       sqlcpdac(ddsacb, &req_ccbs, SQLC_CSRT_ALL, TRUE);
                       break;
                  case SQLJR_RPC:
                       req_ari = 1;
                       break;
              }
              break;
  case SQLJ_DBSV: switch (dcsra->sqlrtype)
              {
                  case SQLJR_COMPILE:  req_compile = 1;
                                       break;
                  case SQLJR_RUNSTATS: req_runstat = 1;
                                       break;
                  case SQLJR_OPEN:     req_open_cursor = 1;
                                       break;
                  case SQLJR_CLOSE:    req_close_cursor = 1;
                                       break;
                  case SQLJR_PREPARE :
                  case SQLJR_DESCRIBE: req_prep_desc =1;
                                       break;
                  case SQLJR_FETCH:    req_fetch = 1;
                                       break;
                  case SQLJR_EXECUTE:  req_exec =1;
                                       break;
              }
              break;
}                             /* End Switch                         */

/* If it is a fetch JRA request, find */
                              /* the cursor control block. If the   */
                              /* cursor control block is found, then*/
                              /* check to see whether there is a row*/
                              /* in the com buffer. If there is one */
                              /* locally, then recevie from the     */
                              /* the com buffer. Otherwise, send the*/
                              /* the fetch request to the server    */ if (req_fetch)
```

```
{
    sqlcpcsr(ccbptr,req_ccbs,(short) *(dcsra->sqlrsect),
            dcsra->sqlrcrea,(int) dcsra->sqlrcrel,
            dcsra->sqlrpgmn,(int) dcsra->sqlrpgml);

if ((ccbptr != NULL) && (ccbptr->curs_status == SQLCP_NO_DATA))
    {
        sqlcpsca(sqlca,"SQLCPREQ",(long)SQL_RC_W100);
        retcode = SQLJR_RCF_SQLCA;
        goto exit;
    } if ((ccbptr != NULL) && (ccbptr->curs_status == SQLCP_OPEN_BLOCK))
    {
        req_blocking = 1;
    }
    if ((req_blocking) &&
        (ccbptr->num_rows_fetched < ccbptr->num_rows))
    {
        sqlcp_get_ca_retcode(sqlca,&ddsretcode,ccbptr->buffer,
                      (int *)&ccbptr->buf_pos);
        ccbptr->num_rows_fetched ++;
        if (sqlca->sqlcode == SQL_RC_W100)
        {
            ccbptr->curs_status = SQLCP_NO_DATA;
            retcode |= ddsretcode;
            goto exit;
        }
        if ((sqlca->sqlcode < 0) || (sqlca->sqlcode == SQL_RC_W100))
        {
            retcode |= ddsretcode;
            goto exit;
        }
        sqlcp_get_data(ddsacb,sqlda,ccbptr,ccbptr->buffer,
                      (int *)&ccbptr->buf_pos,sqlca);
        goto exit;
    }
}
/*####################Tempory fix for database name
problem############# */
/* BSU routine pass alias instead of database name in the router    */
gdcsacb = dcsacb;
if (req_startusing)
{
    dcsra->sqlrdbnl = dcsacb->sqlldbnl;
    dcsra->sqlrdbnt = dcsacb ->sqlldbnt;
    dcsra->sqlrdbnm = dcsacb->sqlldbn;
}
/*####################Tempory fix for database name
problem############# */
                                /* Send the JRA request              */
                                /* Then call the receive routine to  */
                                /* recevie the response              */
retcode = sqlcpsnd(ddsacb, dcsra);
if (retcode == 0)
{
    retcode = sqlcprrv(ddsacb, dcsra);
} exit:

if ( (retcode & SQLJR_RCF_TERMINATE) == SQLJR_RCF_TERMINATE)
{
    retcode |= SQLJR_RCF_SQLCA;
}
sqlt_fnc_retcode(SQLT_SQLC, SQLT_SQLCPREQ, retcode);
sqlt_perf_exit(SQLT_SQLC, SQLT_SQLCPREQ, 2, 0, NULL);
return(retcode);
}
```

SERVER CODE

```
*                                                                    *
* MODULE NAME:      sqlcpsvr                                         *
*                                                                    *
* COMPONENT NAME:   Distributed Data Services
*
/********************************************************************/
/* Function name: SQLCPSVR_RECEIVE
*/
```

```c
/* Function:                                                              */
/*        Receive a JRA request from a client, and marshall it.           */
/* Input:                                                                 */
/*        DDSACB pointer                                                  */
/* Output:                                                                */
/*        Return code of status of operation.                             */
/**************************************************************************/ short SQLZ_LOCAL sqlcpsvr_receive(struct sqlcacb *ddsacb)

{
    short retcode = 0;              /* Function return code.              */
    short t_count, t_count2;        /* Looping variables.                 */
    unsigned char *buf_ptr;         /* Pointer for use in scanning larger */
                                    /* buffer.                            */
    unsigned char *cb_buf_ptr;      /* Used only for parsing das.         */
    unsigned short buffer_len;      /* Length of the comm buffer.         */
    unsigned long total_len;        /* Total length of the entire request */
    unsigned long total_input_len;  /* Total length except output data.   */
    unsigned long ctl_struct_len;   /* Length of the control structures.  */
    unsigned long in_data_len;      /* Length of the input data.          */
    unsigned long out_data_len;     /* Length of the output data.         */
    unsigned long num_in_sqlvars;   /* Number of entries in the array of  */
                                    /* input data lengths.                */
    unsigned long num_out_sqlvars;  /* Number of output SQLVARs.          */ unsigned long input_da_len;     /* Length of the input DA (no data).  */
    char *jra_params;               /* Pointer to the SQLJRA parameters.  */
    char **triplet_ptr;             /* Pointer to triplets in SQLJRA.     */
    unsigned long *length_ptr;      /* Pointer to length field in triplets*/
    unsigned long *in_da_lens;      /* Pointer to array of actual input   */
                                    /* DA lengths.                        */
    struct sqlda *in_da_ptr = NULL; /* Pointer to input DA in the buffer. */
    char *input_data;               /* Pointer to the start of the input  */
                                    /* data.                              */
    char *output_data;              /* Pointer to the start of the output */
                                    /* data.                              */
    struct sqlvar *t_sqlvar;        /* Pointer to a SQLVAR from SQLDA     */
    struct sqlda *private_out_da;   /* Private copy of the output DA.     */
                                    /* move_data call.                    */
    unsigned long total_received;   /* Total received so far.             */
    unsigned int amt_to_copy;       /* Amount left to copy.               */
    unsigned int temp_holder;       /* Variable to hold last two bytes of */
                                    /* buffer during copy of next comm    */
                                    /* buffer.                            */
    unsigned short receive_length;  /* How much data was received.        */
    unsigned short parse_da_data = FALSE;
                                    /* Should data for the das be parsed  */
                                    /* to see if it has to go in multiple*/
                                    /* bufs?                              */ unsigned long *t_in_da_lens;    /* Pointer to array of actual input   */
    unsigned short start_var;       /* Which is first sqlvar in this seg? */
    unsigned short total_var_space; /* How much space used up in cur seg? */ unsigned short this_var_space;  /* How much space does this var take  */
                                    /* up?                                */
    short done_with_input;          /* Are we done with the input var?    */
    unsigned char *t_run_ptr;       /* Temp pointer for runstats.         */
    unsigned char *t_addr_ptr;      /* Temp pointer for runstats.         */
    struct sqlcp_ccb *temp_ccb;     /* Temp CCB pointer.                  */
    unsigned long rcv_out_da_len;   /* Length of the output DA sent by rqr*/

/**************************************************************************/

/* Get the address of the comm buffer.*/
                                    /* Get the length of the data in the  */
                                    /* buffer (it is byte-reversed).      */
                                    /* Byte reverse it.                   */
                                    /* Move the pointer to start of the   */
                                    /* SQLJRA.                            */
    comm_buffer = ddsacb->buffer;
    sqlzmcpy(&buffer_len, comm_buffer, SQLC_SHORT_SIZE);
    buffer_len = SQLC_SWAP2(buffer_len);
    comm_buffer += SQLC_SHORT_SIZE;

/* Set a pointer to the SQLJRA in the */
                                    /* Comm buffer.                       */
                                    /* Move to the length fields.         */
```

```c
dcsra = (SQLJDSRA *)&comm_buffer F0 ;
comm_buffer += sizeof(SQLJDSRA);

/* Assign the SQLCA in the SQLJRA.     */
dcsra->sqlrcap = (char *) &ddsacb->cb.aacb.sqlca;
                              /* No errors found.                    */
                              /* Clear out status variable for out   */
                              /* DA memory storage.                  */
                              /* Clear out variables to tell us what */
                              /* kind of request this is. We only    */
                              /* care about a few special request    */
                              /* types that require special          */
                              /* processing.                         */
                              /* Find out if this is a start using.  */
                              /* Find out if this is a compile stmt  */
                              /* or not. Compile statements have     */
                              /* input Das, but no input data. The   */
                              /* DA has SQLVAR length and name
 */
                              /* information for the host variables  */
                              /* so we don't want to try to set the  */
                              /* data pointers in the DA.            */
                              /* Find out if this is a runstats.     */
                              /* runstats has input DA too, but no   */
                              /* data. Also we have to adjust the    */
                              /* pointers in the
DCSRA->SQLJRDATA F1*/
                              /* field to point to the input DA      */
                              /* Find out if it is one of several    */
                              /* other type of commands that need    */
                              /* special processing.                 */
error_found = 0;
allocate_out_da = 0;
start_using = 0;
compile = 0;
runstat = 0;
prep_desc = 0;
ari = 0;
op_stat = 0;
open_cursor = 0;
close_cursor = 0;
fetch = 0;
exec = 0;
blocking = 0;
switch (dcsra->sqltype)
{
   case SQLJ_DCSSV: switch (dcsra->sqlrtype)
            {
              case SQLJR_STARTGW:
                         start_using = 1;
                   if (ddsacb->length > SQLC_SIZE_MAXQRYBLK)
                   {
                       ddsacb->length = SQLC_SIZE_MAXQRYBLK;
                   }
                         break;
              case SQLJR_RPC:
                         ari = 1;
                         break;
              case SQLC_RT_OPSTAT:  op_stat = 1;
                         break;
            }
            break;
   case SQLJ_DBSV: switch (dcsra->sqlrtype)
            {
              case SQLJR_COMPILE: compile = 1;
                         break;
              case SQLJR_RUNSTATS: runstat = 1;
                         break;
              case SQLJR_PREPARE:
              case SQLJR_DESCRIBE: prep_desc = 1;
                         break;
              case SQLJR_OPEN:    open_cursor = 1;
                         break;
              case SQLJR_CLOSE:   close_cursor = 1;
                         break;
              case SQLJR_FETCH:   fetch = 1;
                         break;
              case SQLJR_EXECUTE:  exec =1;
                         break;
```

```
        }
                break;
}
                                /* Get the control structures length */
                                /* Get the input data length.        */
                                /* Get the output data length.       */
                                /* Get the number of input sqlvars.  */
                                /* Get the number of output sqlvars. */
                                /* Get the size of the input DA.     */
                                /* If it is zero in the JRA, leave it*/
                                /* Otherwise it is a DA of num_in_var*/
                                /*   sqlvars. This can be smaller    */
                                /*   than the size in the JRA (if the*/
                                /*   sqld field is smaller than sqln).*/
                                /* Get the size of the output DA for */
                                /* both memory allocation and rcving.*/
sqlzmcpy(&ctl_struct_len, comm_buffer, SQLC_LONG_SIZE);
comm_buffer += SQLC_LONG_SIZE;
sqlzmcpy(&in_data_len, comm_buffer, SQLC_LONG_SIZE);
comm_buffer += SQLC_LONG_SIZE;
sqlzmcpy(&out_data_len, comm_buffer, SQLC_LONG_SIZE);
comm_buffer += SQLC_LONG_SIZE;
sqlzmcpy(&num_in_sqlvars, comm_buffer, SQLC_LONG_SIZE);
comm_buffer += SQLC_LONG_SIZE;
sqlzmcpy(&num_out_sqlvars, comm_buffer, SQLC_LONG_SIZE);
comm_buffer += SQLC_LONG_SIZE;
if (compile )
{
    input_da_len = dcsra->sqlrdail;
}
else
{
    input_da_len = (dcsra->sqlrdail > 0) ? SQLDASIZE(num_in_sqlvars) : 0;
}
output_da_len = dcsra->sqlrdaol;
rcv_out_da_len = output_da_len;
if  (output_da_len > 0)
{
    rcv_out_da_len = SQLDASIZE(num_out_sqlvars);
}

/* Get the data length sent from the */
                                /* client. It is composed as follows*/
                                /* 1) Two bytes - Length of buffer.  */
                                /* 2) Size of all control structs.   */
                                /* 3) Sizes of input/output DAs.     */
                                /* 4) Size of input data.            */
                                /* Get our total space needs. It is  */
                                /* equal to the input space plus the */
                                /* space needed for the output data. */
  total_input_len = SQLC_SHORT_SIZE + ctl_struct_len + input_da_len +
            rcv_out_da_len + in_data_len;
  total_len = SQLC_SHORT_SIZE + ctl_struct_len + input_da_len + output_da_len
            + in_data_len + out_data_len;

/* If everything will fit into the   */
                                /* one Comm. buffer...               */
                                /* 1) We don't need any segments.    */
                                /* 2) Set up a pointer for rest of   */
                                /*    the buffer manipulations.      */
  if (total_len <= ddsacb->length)
  {
      num_segs_needed = 0;
      buf_ptr = comm_buffer;
  }
  else
  {
                                /* If it will all fit into one segmemt*/
                                /* (64K or less).                    */
                                /* Mark that we need one segment.    */
                                /* Get the segment.                  */
                                /* Copy the comm buffer into the     */
                                /*  segment.                         */
                                /* Set the pointer in the segment for*/
                                /* the next receive.                 */
                                /* Get the length of the first receive*/
                                /* Mark that as received so far.     */
```

```
                                    /* While there's more to get...        */
                                    /* Find out how much is left to copy.*/
                                    /* If it is less than one buffer...    */
                                    /*   Adjust amount to receive.         */
                                    /* Save the last two bytes received.   */
                                    /* Get the next buffer.                */
                                    /* Copy back the 2 bytes (over the     */
                                    /*  new buffer's LL field).            */
                                    /* Increment total.                    */
                                    /* Move forward for next receive.      */
    if (total_len <= SQLO_MAXSEGSIZ)
    {
        retcode = sqloallocseg((unsigned int) total_len,
                        (char **) &segments F0 ,
                        SQLO_MM_SHARE_GIVE);
        if (retcode != 0)
        {
            sqlcpsca((struct sqlca *)dcsra->sqlrcap, "SQLCPSVR",
                    (long) SQL_RC_E954);
            sqlt_trace_error(SQLT_SQLC, SQLT_SQLCPSVR, 102, sizeof(short),
                        &retcode);
            retcode = SQLJR_RCF_SQLCA;
            error_found = 1;
                goto rcv_end;
        }
        num_segs_needed = 1;
        sqlzmcpy(segments F0 , ddsacb->buffer, buffer_len);
        buf_ptr = segments F0 + buffer_len - SQLC_SHORT_SIZE;
        receive_length = ddsacb->length;
        total_received = receive_length;
        while (total_received < total_input_len)
        {
            amt_to_copy = (unsigned int)
                        (total_input_len - total_received +
SQLC_SHORT_SIZE);
            if (amt_to_copy < ddsacb->length)
            {
                receive_length = amt_to_copy;
            }
            sqlzmcpy(&temp_holder, buf_ptr, SQLC_SHORT_SIZE);
            retcode = sqlccrcv(&(ddsacb->comhandle), &receive_length,
                        buf_ptr, SQLC_FILL);
            if (retcode != 0)
            {
                sqlcperc(&ddsacb->comhandle,(struct sqlca *)dcsra->sqlrcap,
                        "SQLCPSVR");
/*              sqlcpsca((struct sqlca *)dcsra->sqlrcap, "SQLCPSVR",
                        (long) SQL_RC_E30080);                              */
                sqlt_system_error(SQLT_SQLC, SQLT_SQLCPSVR, 108,
sizeof(short),
                            &retcode);
                retcode = SQLJR_RCF_TERMINATE | SQLJR_RCF_SQLCA;
                error_found = 1;
                goto rcv_end;
            }
            sqlzmcpy(buf_ptr, &temp_holder, SQLC_SHORT_SIZE);
            total_received += receive_length - SQLC_SHORT_SIZE;
            buf_ptr += receive_length - SQLC_SHORT_SIZE;
        }

/* Set up the SQLJRA pointer.          */
                                    /* Mark location in new buffer.        */
        dcsra = (SQLJDSRA *) ((char *) segments F0 +
SQLC_SHORT_SIZE);
        buf_ptr = segments F0 + (comm_buffer - ddsacb->buffer);
    }
    else
    {
                                    /* We need a minimum of 3 buffers.     */
                                    /* Allocate a buffer for the control   */
                                    /* structures (SQLJRA...)              */
                                    /* Allocate a buf for input da.        */
                                    /* Allocate a buf for output da.       */
                                    /* Mark that we have to parse da       */
                                    /* data.                               */
        retcode = sqloallocseg((unsigned int)
                        (SQLC_SHORT_SIZE + ctl_struct_len),
                        (char **) &segments F0 ,
SQLO_MM_SHARE_GIVE);
```

```
          if (retcode != 0)
          {
             sqlcpsca((struct sqlca *)dcsra->sqlrcap, "SQLCPSVR",
                    (long) SQL_RC_E954);
             sqlt_trace_error(SQLT_SQLC, SQLT_SQLCPSVR, 103, sizeof(short),
                    &retcode);
             retcode = SQLJR_RCF_SQLCA;
             error_found = 1;
             goto rcv_end;
          }
          num_segs_needed = 1;
          retcode = sqloallocseg((unsigned int) input_da_len,
                          (char **) &segments F1 ,
SQLO_MM_SHARE_GIVE);

if (retcode != 0)
          {
             sqlcpsca((struct sqlca *)dcsra->sqlrcap, "SQLCPSVR",
                    (long) SQL_RC_E954);
             sqlt_trace_error(SQLT_SQLC, SQLT_SQLCPSVR, 104, sizeof(short),
                    &retcode);
             retcode = SQLJR_RCF_SQLCA;
             error_found = 1;
             goto rcv_end;
          }
          num_segs_needed = 2;
          retcode = sqloallocseg((unsigned int) output_da_len,
                          (char **) &segments F2 ,
                          SQLO_MM_SHARE_GIVE);
          if (retcode != 0)
          {
             sqlcpsca((struct sqlca *)dcsra->sqlrcap, "SQLCPSVR",
                    (long) SQL_RC_E954);
             sqlt_trace_error(SQLT_SQLC, SQLT_SQLCPSVR, 105, sizeof(short),
                    &retcode);
             retcode = SQLJR_RCF_SQLCA;
             error_found = 1;
             goto rcv_end;
          }
          num_segs_needed = 3;
          parse_da_data = TRUE;

/* Get start of first comm buffer.  */
                          /* Receive control data into a segment*/
                          /* If there's an input da, get it.   */
                          /* If there's an output da, get it.  */
          cb_buf_ptr = ddsacb->buffer;
          retcode = sqlcpgd(ddsacb, &cb_buf_ptr, ddsacb->buffer, segments F0 ,
                    (unsigned int) (SQLC_SHORT_SIZE +
ctl_struct_len),
                    FALSE);
          if (retcode != 0)
          {
             sqlcperc(&ddsacb->comhandle,(struct sqlca *)dcsra->sqlrcap,
                    "SQLCPSVR");
/*           sqlcpsca((struct sqlca *)dcsra->sqlrcap, "SQLCPSVR",
                    (long) SQL_RC_E30080);                        */
             sqlt_trace_error(SQLT_SQLC, SQLT_SQLCPSVR, 109, sizeof(short),
                    &retcode);
             retcode = SQLJR_RCF_TERMINATE | SQLJR_RCF_SQLCA;
             error_found = 1;
             goto rcv_end;
          }
          if (input_da_len > 0)
          {
             retcode = sqlcpgd(ddsacb, &cb_buf_ptr, ddsacb->buffer,
                          segments F1 , (unsigned int) (input_da_len),
                          FALSE);
             if (retcode != 0)
             {
                sqlcperc(&ddsacb->comhandle,(struct sqlca *)dcsra->sqlrcap,
                       "SQLCPSVR");
/*              sqlcpsca((struct sqlca *)dcsra->sqlrcap, "SQLCPSVR",
                       (long) SQL_RC_E30080);                        */
                sqlt_trace_error(SQLT_SQLC, SQLT_SQLCPSVR, 110,
sizeof(short),
                             &retcode);
                retcode = SQLJR_RCF_TERMINATE | SQLJR_RCF_SQLCA;
                error_found = 1;
```

```
                    goto rcv_end;
                }
            }
            if (rcv_out_da_len > 0)
            {
                retcode = sqlcpgd(ddsacb, &cb_buf_ptr, ddsacb->buffer,
                            segments F2 , (unsigned int) (rcv_out_da_len),
                            FALSE);
                if (retcode != 0)
                {
                    sqlcperc(&ddsacb->comhandle,(struct sqlca *)dcsra->sqlrcap,
                        "SQLCPSVR");
/*                  sqlcpsca((struct sqlca *)dcsra->sqlrcap, "SQLCPSVR",
                            (long) SQL_RC_E30080);                          */
                    sqlt_trace_error(SQLT_SQLC, SQLT_SQLCPSVR, 111,
sizeof(short),
                            &retcode);
                    retcode = SQLJR_RCF_TERMINATE | SQLJR_RCF_SQLCA;
                    error_found = 1;
                    goto rcv_end;
                }
            }

/* Set up the SQLJRA pointer.       */
                                    /* Mark location in new buffer.     */
            dcsra = (SQLJDSRA *) ((char *) segments F0 +
SQLC_SHORT_SIZE);
            buf_ptr = segments F0  + (comm_buffer - ddsacb->buffer);
        }
    }

/* Get a pointer to start of array of */
                                    /* actual input DA data lengths.      */
                                    /* Move comm buffer ptr to JRA params.*/
                                    /* Get a pointer to the JRA params.   */
    in_da_lens = (unsigned long *)&buf_ptr F0 ;
    buf_ptr += (num_in_sqlvars * SQLC_LONG_SIZE);
    jra_params = (char *)&buf_ptr F0 ;

/* Point to first triplet. ASSUME   */
                                    /* THAT INDICATOR ARRAY IS FIRST!!!
*/
                                    /* For each triplet...              */
                                    /* Set the pointer field to point   */
                                    /* to the proper parameter field.   */
                                    /* Move the pointer in the parameters*/
                                    /* field based on field length.     */
                                    /* Move to the next triplet.        */
    triplet_ptr = &(dcsra->sqlrflag);
    length_ptr = &(dcsra->sqlrflgl);
    for (t_count = 0; t_count < SQLC_NUM_TRIPLETS; t_count++)
    {
        if   (((unsigned long) *length_ptr) > 0)
        {
            *triplet_ptr = jra_params;
            jra_params += (unsigned long) *length_ptr;
        }
        else
        {
            *triplet_ptr = NULL;
        }
        triplet_ptr = (char **) ((char *) triplet_ptr + SQLC_TRIPLET_SIZE);
        length_ptr = (unsigned long *) ((char *) length_ptr + SQLC_TRIPLET_SIZE);
    }

/* Set a pointer to start of DA area. */
                                    /* Initialize the output DA ptr.      */
                                    /* If there's an input DA, set the ptr*/
                                    /* If there's an output DA...         */
                                    /*   Set the pointer.                 */
                                    /*   If this is all in the comm buffer.*/
                                    /*     Get private storage.           */
                                    /*     If can't, error and leave.     */
                                    /*   Copy the DA to private storage.  */
                                    /*     NOTE: Output DA must be copied */
                                    /*           out of the buffer,       */
                                    /*           because it can be wiped  */
                                    /*           out when we store return */
```

```
                                        /*        data (and we need it then*/
buf_ptr = (char *) dcsra + ctl_struct_len;
out_da_ptr = NULL;
if (input_da_len > 0)
{
    in_da_ptr = (struct sqlda *) ((parse_da_data) ? segments F1 : buf_ptr);
}
if (output_da_len > 0)
{
    out_da_ptr = (struct sqlda *) ((parse_da_data) ?
                            segments F2 : (buf_ptr + input_da_len));
    allocate_out_da = FALSE;
    if (num_segs_needed == 0)
    {
        retcode = sqlogblk(ddsacb->rsheap, (unsigned) output_da_len,
                        &private_out_da);
        if (retcode != 0)
        {
            sqlcpsca((struct sqlca *)dcsra->sqlrcap, "SQLCPSVR",
                    (long) SQL_RC_E962);
            sqlt_trace_error(SQLT_SQLC, SQLT_SQLCPSVR, 102, sizeof(short),
                        &retcode);
            retcode = SQLJR_RCF_SQLCA;
            error_found = 1;
            goto rcv_end;
        }
        allocate_out_da = 1;
        sqlzmcpy(private_out_da, out_da_ptr, (unsigned int) output_da_len);
        out_da_ptr = private_out_da;
    }
}

/* Set the pointers to the input and    */
                                /* output SQLDAs.                        */
dcsra->sqlrdapi = (char *) in_da_ptr;
dcsra->sqlrdapo = (char *) out_da_ptr;

/* If this is a runstat operation...    */
                                /* Get a pointer to the start of the    */
                                /*  array of pointers in the proper     */
                                /*  triplet.                            */
                                /* Loop through the number of indexes.*/
                                /* For each, put the address of the     */
                                /*  string containing the index name    */
                                /*  (which is in a SQLVAR), in the      */
                                /*  data triplet.                       */
                                /* Move forward in triplet to next ind*/
if (runstat)
{
    t_run_ptr = dcsra->sqlrdata F1 .sqlrdtp;
    for (t_count = 0; t_count <
        (short) (dcsra->sqlrdata F1 .sqlrdtl / SQLC_LONG_SIZE);
        t_count++)
    {
        t_addr_ptr = (char *) in_da_ptr->sqlvar Ft_count .sqlname.data;
        sqlzmcpy(t_run_ptr, &t_addr_ptr, SQLC_LONG_SIZE);
        t_run_ptr += SQLC_LONG_SIZE;
    }

/* Fix the number of indexes in the     */
                                /* triplet.                             */
                                /* Clear out the input da in the JRA.   */
                                /* (we only need it for index names).*/
    dcsra->sqlrdata F1 .sqlrdtl /= SQLC_LONG_SIZE;
    dcsra->sqlrdapi = NULL;
    dcsra->sqlrdail = 0;
}

/* Clear out the input data pointer.    */
                                /* If there's an input DA, and this     */
                                /*  is not a "compile SQL" stmt...      */
                                /*  and not a "runstat" stmt...         */
                                /* If we need input data in a segment.*/
input_data = NULL;
if ((in_da_ptr != NULL) && (!compile) && (!runstat))
{
    if  (!parse_da_data)
    {
                                /* Now we must deal with input data.    */
                                /* If there is input data...            */
```

```c
                         /* Loop through all sqlvars. For   */
                         /*   each SQLVAR...                */
                         /*   1) Get a pointer to the SQLVAR. */
                         /*   2) If column data is NULL...  */
                         /*      Set up NULL pointer.       */
                         /*      Move forward in buffer.    */
                         /*   3) Else,                      */
                         /*      Set up the data pointer.   */
                         /*      Move in the data the size  */
                         /*      of this data item (to the  */
                         /*      next item.                 */
                         /*   4) Move to the next length in */
                         /*      the array of lengths.      */
        input_data = (char *) (buf_ptr + input_da_len + rcv_out_da_len);
        for (t_count = 0; t_count < (unsigned int) num_in_sqlvars; t_count++)
        {
            t_sqlvar = (struct sqlvar *) &(in_da_ptr->sqlvar[t_count]);
            if ((t_sqlvar->sqltype & SQL_TYP_NULINC) != 0)
            {
                t_sqlvar->sqlind = (short *) input_data;
                input_data += SQLC_SHORT_SIZE;
            }
            if (((t_sqlvar->sqltype & SQL_TYP_NULINC) == 0) ||
                ((short) *t_sqlvar->sqlind >= 0))
            {
                t_sqlvar->sqldata = (unsigned char *) input_data;
                input_data += (unsigned long) *in_da_lens;
            }
            in_da_lens = (unsigned long *) ((char *) in_da_lens +
SQLC_LONG_SIZE);
        }
    }
    else
    {
                         /* Else we need 1 or more data segs. */
                         /* Save pointer to input lengths.    */
                         /* Save first var number of this seg. */
                         /* No vars saved yet.                */
                         /* For all of the sqlvars...         */
                         /* Not yet done with input.          */
        t_in_da_lens = in_da_lens;
        start_var = 0;
        total_var_space = 0;
        done_with_input = FALSE;
        for (t_count = 0; t_count < (unsigned int) num_in_sqlvars; t_count++)
        {
                         /* Get the SQLVAR.                   */
                         /* Get the space needed for this var. */
            t_sqlvar = (struct sqlvar *) &(in_da_ptr->sqlvar[t_count]);
            this_var_space = 0;
            if ((t_sqlvar->sqltype & SQL_TYP_NULINC) != 0)
            {
                this_var_space = SQLC_SHORT_SIZE;
            }
            this_var_space += (unsigned short)
                              ((unsigned long) *in_da_lens);

/* If this var won't fit in the seg. */
                         /* Allocate seg for previous vars.   */
                         /* Get the data in the segment.      */
            if ((unsigned long) total_var_space + this_var_space >
                SQLO_MAXSEGSIZ)
            {
alloc_space:
                retcode = sqloallocseg(total_var_space, (char **)
                                &segments[num_segs_needed],
                                SQLO_MM_SHARE_GIVE);
                if (retcode != 0)
                {
                    sqlcpsca((struct sqlca *)dcsra->sqlrcap, "SQLCPSVR",
                            (long) SQL_RC_E954);
                    sqlt_trace_error(SQLT_SQLC, SQLT_SQLCPSVR, 106,
                            sizeof(short), &retcode);
                    retcode = SQLJR_RCF_SQLCA;
                    error_found = 1;
                    goto rcv_end;
                }
                retcode = sqlcpgd(ddsacb, &cb_buf_ptr, ddsacb->buffer,
                            segments[num_segs_needed], total_var_space,
```

```
                              FALSE);
                        if (retcode != 0)
                        {
                           sqlcperc(&ddsacb->comhandle,
                                 (struct sqlca *)dcsra->sqlrcap,
                                 "SQLCPSVR");
/*                         sqlcpsca((struct sqlca *)dcsra->sqlrcap, "SQLCPSVR",
                                 (long) SQL_RC_E30080);                              */
                           sqlt_trace_error(SQLT_SQLC, SQLT_SQLCPSVR, 112,
                                 sizeof(short), &retcode);
                           retcode = SQLJR_RCF_TERMINATE |
SQLJR_RCF_SQLCA;
                           error_found = 1;
                           goto rcv_end;
                        }

/* Now we have to go back and update   */
                                    /* the pointers for the segment.       */
                                    /* Loop through the vars in this seg.  */
                                    /* Get the SQLVAR.                     */
                                    /* Update either Null ind or data.     */
                                    /* Move forward the length pointer.    */
                        input_data = segments[num_segs_needed];
                        for (t_count2 = start_var; t_count2 < t_count; t_count2++)
                        {
                           t_sqlvar = (struct sqlvar *)
                                 &(in_da_ptr->sqlvar[t_count2]);
                           if ((t_sqlvar->sqltype & SQL_TYP_NULINC) != 0)
                           {
                              t_sqlvar->sqlind = (short *) input_data;
                              input_data += SQLC_SHORT_SIZE;
                           }
                           if (((t_sqlvar->sqltype & SQL_TYP_NULINC) == 0) ||
                               ((short) *t_sqlvar->sqlind >= 0))
                           {
                              t_sqlvar->sqldata = (unsigned char *) input_data;
                              input_data += (unsigned long) *t_in_da_lens;
                           }
                           t_in_da_lens = (unsigned long *)
                                 ((char *) t_in_da_lens + SQLC_LONG_SIZE);
                        }

/* Set up for next segment...          */
                                    /* Save start of lengths.              */
                                    /* Current var size is current total.  */
                                    /* Current var is first var of segment*/
                                    /* Move forward to next segment.       */
                        t_in_da_lens = in_da_lens;
                        total_var_space = this_var_space;
                        start_var = t_count;
                        num_segs_needed++;

/* If we were just putting the last    */
                                    /* vars in the buffer, skip on.        */
                        if (done_with_input)
                        {
                           goto exit_input;
                        }
                     }
                     else
                     {
                                    /* Just add this var to total if it    */
                                    /* fits.                               */
                        total_var_space += this_var_space;
                     }
                                    /* Get next var's length.              */
                     in_da_lens = (unsigned long *) ((char *) in_da_lens +
SQLC_LONG_SIZE);
                  }

/* We are done with loop, but the last*/
                                    /* SQLVAR(s) need to be put in a seg.*/
                                    /* Set a flag, and go back to take    */
                                    /*  care of them.                     */
                  done_with_input = TRUE;
                  goto alloc_space;
               exit_input: ;
            }
         }
```

```
                                    /* If there's output data and this is */
                                    /* not a prepare or describe...        */
if ((out_da_ptr != NULL) && (!prep_desc))
{
                                    /* If all output data fits in the     */
                                    /* one allocated segment...           */
    if (!parse_da_data)
    {
                                    /* Output data all resides in one     */
                                    /*   area (need not be segmented).    */
                                    /* For each output SQLVAR...          */
                                    /* 1) Get a pointer to the SQLVAR.    */
                                    /* 2) If this field is nullable.      */
                                    /*      and there was a null pointer  */
                                    /*      on the requester...           */
                                    /*      Set the pointer for the null  */
                                    /*      indicator.                    */
                                    /*      Move forward in the output    */
                                    /*      data.                         */
                                    /* 3) Set the pointer for the data.   */
                                    /* 4) Move forward in the output data*/
        if (input_data == NULL)
        {
            output_data = (char *) (buf_ptr + input_da_len + rcv_out_da_len);
        }
        else
        {
            output_data = (char *) (input_data);
        }
        for (t_count = 0; t_count < out_da_ptr->sqld; t_count++)
        {
            t_sqlvar = (struct sqlvar *) &(out_da_ptr->sqlvar[t_count] );
            if (((t_sqlvar->sqltype & SQL_TYP_NULINC) != 0) &&
                (t_sqlvar->sqlind == 0))
            {
                t_sqlvar->sqlind = (short *) output_data;
                output_data += SQLC_SHORT_SIZE;
            }
            else
            {
                t_sqlvar->sqlind = NULL;
            }
            t_sqlvar->sqldata = (unsigned char *) output_data;
            output_data += sqlcpdlr(t_sqlvar);
        }
    }
    else
    {
                                    /* Else we need one or more output    */
                                    /* data segments.                     */
                                    /* Save first var number of this seg. */
                                    /* No vars saved yet.                 */
                                    /* For all of the sqlvars...          */
                                    /* Not yet done with input.           */
        start_var = 0;
        total_var_space = 0;
        done_with_input = FALSE;
        for (t_count = 0; t_count < out_da_ptr->sqld; t_count++)
        {
                                    /* Get the SQLVAR.                    */
                                    /* Get the space needed for this var. */
            t_sqlvar = (struct sqlvar *) &(out_da_ptr->sqlvar[t_count] );
            if (((t_sqlvar->sqltype & SQL_TYP_NULINC) != 0) &&
                (t_sqlvar->sqlind == 0))
            {
                this_var_space = SQLC_SHORT_SIZE;
            }
            else
            {
                this_var_space = 0;
            }
            this_var_space += sqlcpdlr(t_sqlvar);

/* If this var won't fit in the seg.  */
                                    /* Allocate seg for previous vars.    */
                                    /* Get the data in the segment.       */
            if ((unsigned long) total_var_space + this_var_space >
                SQLO_MAXSEGSIZ)
            {
```

```
alloc_space_out:
                retcode = sqloallocseg(total_var_space, (char **)
                          &segments[num_segs_needed ,
                          SQLO_MM_SHARE_GIVE);
                if (retcode != 0)
                {
                    sqlcpsca((struct sqlca *)dcsra->sqlrcap, "SQLCPSVR",
                             (long) SQL_RC_E954);
                    sqlt_trace_error(SQLT_SQLC, SQLT_SQLCPSVR, 107,
                                     sizeof(short), &retcode);
                    retcode = SQLJR_RCF_SQLCA;
                    error_found = 1;
                    goto rcv_end;
                }

/* Now we have to go back and update  */
                                /* the pointers for the segment.      */
                                /* Loop through the vars in this seg. */
                                /*  Get the SQLVAR.                   */
                                /*  Update either Null ind or data.   */
                                /*  Move forward the length pointer.  */
                output_data = segments[num_segs_needed ;
                for (t_count2 = start_var; t_count2 < t_count; t_count2++)
                {
                    t_sqlvar = (struct sqlvar *)
                               &(out_da_ptr->sqlvar[t_count2 );
                    if ((t_sqlvar->sqltype & SQL_TYP_NULINC != 0) &&
                        (t_sqlvar->sqlind == 0))
                    {
                        t_sqlvar->sqlind = (short *) output_data;
                        output_data += SQLC_SHORT_SIZE;
                    }
                    else
                    {
                        t_sqlvar->sqlind = NULL;
                    }
                    t_sqlvar->sqldata = (unsigned char *) output_data;
                    output_data += sqlcpdlr(t_sqlvar);
                }

/* Set up for next segment...          */
                                /* Current var size is current total. */
                                /* Current var is first var of segment*/
                                /* Move forward to next segment.      */
                total_var_space = this_var_space;
                start_var = t_count;
                num_segs_needed++;

/* If we were just putting the last   */
                                /*  vars in the buffer, skip on.      */
                if (done_with_input)
                {
                    goto exit_output;
                }
            }
            else
            {
                                /* Just add this var to total if it   */
                                /*  fits.                             */
                total_var_space += this_var_space;
            }
        }

/* We are done with loop, but the last*/
                                /* SQLVAR(s) need to be put in a seg.*/
                                /* Set a flag, and go back to take    */
                                /*   care of them.                    */
        done_with_input = TRUE;
        goto alloc_space_out;
exit_output: ;
    }
}

/* If this is a fetch request...      */
                                /*  Get the CCB.                      */
                                /*  If found (blocking)...            */
                                /*   Set on the blocking flag.        */
                                /*   Set up the buffer for return.    */
                                /*   Set up the data in the return    */
                                /*    buffer.                         */
```

```c
   if (fetch)
   {
      sqlcpcsr(temp_ccb, svr_ccbs, *((unsigned short *) dcsra->sqlrsect),
               dcsra->sqlrcrea,
               (unsigned short) dcsra->sqlrcrel, dcsra->sqlrpgmn,
               (unsigned short) dcsra->sqlrpgml);
      if (temp_ccb != NULL)
      {
         blocking = 1;
         comm_buffer = ddsacb->buffer + SQLC_SHORT_SIZE;
         sqlcpfet(ddsacb, &comm_buffer, temp_ccb);
      }
   } rcv_end:
                                           /*Trace the content of the input DA*/
   if (in_da_ptr != NULL)
   {
      sqlt_trace_misc1(SQLT_SQLC,SQLT_SQLCPSVR,190,(short )input_da_len,
                  (void *) in_da_ptr);
   }
/* FIX!!! Error conditions and the return code. */
   return(retcode);
}

/*****************************************************************************/
/* Function name: SQLCPSVR_SEND                                              */
/*                                                                            */
/* Function:                                                              */
/*       This function sends back the response from a query to the       */
/*         client.                                                        */
/* Input:                                                                 */
/*       DDSACB pointer                                                   */
/*       Return code from the router function.                            */
/* Output:                                                                */
/*       The return code from the send function.                          */
/*****************************************************************************/ short SQLZ_LOCAL sqlcpsvr_send(struct sqlcacb *ddsacb, short retcode)

{
   struct sqlca *sqlca_ptr;        /* Pointer to the SQLCA.              */
   signed char sqlca_changed;      /* Was the SQLCA changed by the
engine*/
   signed char is_there_data;      /* Is there output data to send back? */
   short t_count;                  /* Looping variable.                  */
   unsigned int loc_in_buffer;     /* Location in the comm buffer for the*/
   short rc;                       /* Return code from this function.    */
   unsigned short buffer_len;      /* Length of the comm buffer.         */
   struct sqlcp_ccb *temp_ccb;     /* Temporary cursor control block.    */
   SQLE_GLOB *sqleglob;            /* Glob pointer.                      */
   short da_null;                  /* flag indicates whehter there is an */
                                   /* ouput da in the com buffer         */
   unsigned short exec_req_sqlda = FALSE;
                                   /* Ask for output SQLDA?              */
                                   /* Save a pointer to the SQLCA (will  */
                                   /* be lost when we write over the     */
                                   /* SQLJRA in the Comm buffer.         */
   sqlca_ptr = (struct sqlca *)dcsra->sqlrcap;

/* If there was a server error (most  */
                                   /* are with allocating memory, or     */
                                   /* receiving more buffers), skip to   */
                                   /* output.                            */
   if (error_found)
   {
      goto ret_processing;
   }

/* Check whether the requestor request*/
                                   /* or not before sqlca is copied into */
                                   /* the com buffer                     */
   if (exec && (dcsra->sqlrflag FSQLJ_CSRDA_OFF  == SQLJ_OUTSQLDA))
   {
      exec_req_sqlda = TRUE;
      out_da_ptr = (struct sqlda *) dcsra->sqlrdapo;
   }
```

```
                                /* If this is a blocking fetch...    */
                                /* we've loaded up the buffer, and   */
                                /* we just need to send it.          */
if (blocking)
{
    goto send_last_buf;
}

/* For open cursor, the engine may   */
                                /* created a new output SQLDA, which */
                                /* wasn't around when we set up      */
                                /* out_da_ptr. and set up output da  */
                                /* length.                           */
if (open_cursor)
{
    out_da_ptr = (struct sqlda *) dcsra->sqlrdapo;
    if (out_da_ptr != NULL)
    {
        output_da_len = out_da_ptr->sqldabc;
    }

/* If we are blocking from the engine */
                                /* and there were no errors...        */
                                /* Set up global pointers to the      */
                                /*   returned SQLDA.                  */
    if ((retcode & SQLJR_RCF_BLOCK) && (sqlca_ptr->sqlcode == 0) &&
        (out_da_ptr != NULL))
    {
                                /* Try to allocate a cursor control */
                                /* block.                           */
                                /* If we cannot allocate the block, */
                                /* set no blocking in the retcode.  */
                                /* and free the native DA.          */
        rc = sqlcpccb(ddsacb, &svr_ccbs, &temp_ccb, *((unsigned short *)
                dcsra->sqlrsect),
                dcsra->sqlrcrea, (unsigned short) dcsra->sqlrcrel,
                dcsra->sqlrpgmn, (unsigned short) dcsra->sqlrpgml,
                FALSE);
        if  (rc != 0)
        {
            retcode = (retcode & ~SQLJR_RCF_BLOCK) |
SQLJR_RCF_NOBLK;
            sqlefrda(&ddsacb->cb.aacb.sqljacb,out_da_ptr);
            out_da_ptr = NULL;
        }
        else
        {
                                /* If we still are blocking...         */
                                /* If this is a "hold" cursor, set it  */
                                /* in the ccb.                         */
                                /* Set up the pointer to the native    */
                                /* DA...                               */
                                /* Copy the SQLJRA so we can do a      */
                                /* fetch...                            */
            if (retcode & SQLJR_RCF_HOLD)
            {
                temp_ccb->curs_type = SQLC_CSRT_HOLD;
            }
            temp_ccb->native_da = out_da_ptr;
            sqlcpnra();
            temp_ccb->jra = t_jra;
        }
    }
                                /* Else, we are not blocking.       */
                                /* Make sure that blocking is turned */
                                /*    off in the return code.        */
    else
    {
        retcode = (retcode & ~SQLJR_RCF_BLOCK) | SQLJR_RCF_NOBLK;
    }
}

/* If this is a close cursor request. */
                                /* Search for the CCB for the cursor. */
                                /* If found, delete it.               */
if (close_cursor)
{
    sqlcpcsr(temp_ccb, svr_ccbs, *((unsigned short *) dcsra->sqlrsect),
            dcsra->sqlrcrea,
```

```
                    (unsigned short) dcsra->sqlrcrel, dcsra->sqlrpgmn,
                    (unsigned short) dcsra->sqlrpgml);
            if (temp_ccb != NULL)
            {
                sqlcpdcb(ddsacb, &svr_ccbs, temp_ccb, FALSE);
            }
        }

/* If this is a commit or rollback... */
                                /* Clear out the cursor control       */
                                /* blocks.                            */
                                /* Commit clears out all "NOHOLD"     */
                                /* cursors, whereas rollback clears   */
                                /* out ALL of the cursors.            */
        if ((retcode & SQLJR_RCF_COMMIT) || (retcode &
    SQLJR_RCF_ROLLBACK))
        {
            sqlcpdac(ddsacb, &svr_ccbs,
                (retcode & SQLJR_RCF_COMMIT) ? SQLC_CSRT_NOHOLD :
    SQLC_CSRT_ALL,
                    FALSE);
        } ret_processing:
                                /* "NORMAL" processing begins here.    */
                                /* Set the pointer in the Comm buffer */
                                /* past the length field.              */
        comm_buffer = ddsacb->buffer + SQLC_SHORT_SIZE;

/* Put the sqledcsr return code in     */
                                /* the buffer.                         */
                                /* Move forward in the buffer.         */
        sqlzmcpy(comm_buffer, &retcode, SQLC_SHORT_SIZE);
        comm_buffer += SQLC_SHORT_SIZE;

/* Find out if the SQLCA was changed. */
                                /* NOTE: We always send back the CA   */
                                /*       on start using calls, on     */
                                /*       ARI calls, and OP STAT.      */
                                /* Copy the indicator and possibly    */
                                /* copy the SQLCA.                    */
        sqlca_changed = (signed char)
                (((retcode & SQLJR_RCF_SQLCA) || (start_using) ||
                  (ari) || (op_stat))
                    ? SQLC_NOT_NULL : SQLC_IS_NULL);
        sqlcpcca(&comm_buffer, sqlca_changed, sqlca_ptr);

/* If abnormal processing error on    */
                                /* server, look at one.               */
        if (error_found)
        {
            goto send_last_buf;
        }

/* If this was a start using call...  */
                                /* Put the DB name in the buffer.     */
                                /* Put the sever codepage.            */
                                /* Put the server buffer size.        */
                                /* Put the server PID.                */
                                /* Put the server release level.      */
                                /* We are done. Flush the buffer.     */
        if (start_using)
        {
                            /* GET THE EACB PTR
    */
            sqleget_glob(&sqleglob);
            ddsacb->cb.aacb.acbptr = sqleglob->acb;
            if (sqleglob->acb != NULL)
            {
                sqlzmcpy(comm_buffer, ddsacb->cb.aacb.acbptr->dbname, 10);
                comm_buffer += 10;
                sqlzmcpy(comm_buffer, &(ddsacb->cb.aacb.acbptr->codepage),
    SQLC_SHORT_SIZE);
                comm_buffer += SQLC_SHORT_SIZE;
                sqlzmcpy(comm_buffer, &(ddsacb->length), SQLC_SHORT_SIZE);
                comm_buffer += SQLC_SHORT_SIZE;
                sqlzmcpy(comm_buffer, &(ddsacb->cb.aacb.acbptr->processid),
    SQLC_SHORT_SIZE);
                comm_buffer += SQLC_SHORT_SIZE;
```

```c
      sqlzmcpy(comm_buffer, &(ddsacb->cb.aacb.acbptr->threadid),
SQLC_SHORT_SIZE);
      comm_buffer += SQLC_SHORT_SIZE;
/*    sqlzmcpy(comm_buffer, SQLJ_SRVRLSLV, 10); REMOVE COMMENT */
      comm_buffer += 10;
   }
   else
   {
      sqlzmset(comm_buffer,' ',10);
      comm_buffer += 10;
      sqlzmset(comm_buffer,0x00,SQLC_SHORT_SIZE);
      comm_buffer += SQLC_SHORT_SIZE;
      sqlzmcpy(comm_buffer, &(ddsacb->length), SQLC_SHORT_SIZE);
      comm_buffer += SQLC_SHORT_SIZE;
      sqlzmset(comm_buffer,0x00,SQLC_SHORT_SIZE);
      comm_buffer += SQLC_SHORT_SIZE;
      sqlzmset(comm_buffer,0x00,SQLC_SHORT_SIZE);
      comm_buffer += SQLC_SHORT_SIZE;
/*    sqlzmcpy(comm_buffer, SQLJ_SRVRLSLV, 10); REMOVE COMMENT */
      comm_buffer += 10;
   }
   goto send_last_buf;
}

/* If this is a prepare or describe...*/
                              /* or this is an open cursor...       */
if ((prep_desc) || (open_cursor))
{
                              /* If no DA was returned, send da null */
                              /* indicator to the data stream.       */
   if (out_da_ptr == NULL)
   {
      da_null = -1;
      sqlzmcpy(comm_buffer, &da_null, SQLC_SHORT_SIZE);
      comm_buffer += SQLC_SHORT_SIZE;
      goto send_last_buf;
   }
   da_null = 0;
   sqlzmcpy(comm_buffer, &da_null, SQLC_SHORT_SIZE);
   comm_buffer += SQLC_SHORT_SIZE;

/* Send back the output SQLD field   */
                              /* Move the buffer forward.          */
   sqlzmcpy(comm_buffer, &(out_da_ptr->sqld), SQLC_SHORT_SIZE);
   comm_buffer += SQLC_SHORT_SIZE;

/* If the whole DA was placed in     */
                              /* the output DA...                  */
                              /* Send it into the buffer.          */
                              /* Move forward in the buffer.       */
   if (out_da_ptr->sqld <= out_da_ptr->sqln)
   {
      loc_in_buffer = comm_buffer - ddsacb->buffer;
      rc = sqlcpmd(ddsacb, &loc_in_buffer,
              (char *) (out_da_ptr),
              (unsigned int) SQLDASIZE(out_da_ptr->sqld), sqlca_ptr);
      comm_buffer = ddsacb->buffer + loc_in_buffer;
   }

/* If this is an open cursor request. */
                              /* If we are blocking...              */
                              /* Set up the DCSRA to do a fetch.    */
                              /* Fetch a row.                       */
                              /* Call the routine that puts rows in*/
                              /*   the comm buffer.                 */
                              /* ELSE, free up the output DA created*/
                              /*   by the router (internal describe)*/
   if (open_cursor)
   {
      if (retcode & SQLJR_RCF_BLOCK)
      {
         sqlcpcsr(temp_ccb, svr_ccbs,
                 *((unsigned short *) t_jra.sqlrsect), t_jra.sqlrcrea,
                 (unsigned short) t_jra.sqlrcrel, t_jra.sqlrpgmn,
                 (unsigned short) t_jra.sqlrpgml);
         temp_ccb->fet_rc = sqledcsr(&(ddsacb->cb.aacb.sqljacb),
                 (SQLJRA *)&t_jra);
         sqlcpfet(ddsacb, &comm_buffer, temp_ccb);
      }
```

```
        else
        {
            sqlefrda(&ddsacb->cb.aacb.sqljacb,out_da_ptr);
        }
    }

/* We are done, send the last buffer. */
    goto send_last_buf;
}

/* If it is a execute JRA request, and*/
                            /* the requestor requests for an out- */
                            /* put DA, then send a DA null indic- */
                            /* ator to the data stream. If output */
                            /* DA exists, then send the output DA */
                            /* over                               */
if (exec_req_sqlda)
{
    if (out_da_ptr == NULL)
    {
        da_null = -1;
        sqlzmcpy(comm_buffer, &da_null, SQLC_SHORT_SIZE);
        comm_buffer += SQLC_SHORT_SIZE;
        sqlt_trace_error(SQLT_SQLC, SQLT_SQLCPSVR, 101, sizeof(char),
                    &(dcsra->sqlrflag FSQLJ_CSRDA_OFF ));
        goto send_last_buf;
    }
    else
    {
        da_null = 0;
        sqlzmcpy(comm_buffer, &da_null, SQLC_SHORT_SIZE);
        comm_buffer += SQLC_SHORT_SIZE;
    }
                            /* Send back the output SQLD field   */
                            /* Move the buffer forward.          */
    sqlzmcpy(comm_buffer, &(out_da_ptr->sqld), SQLC_SHORT_SIZE);
    comm_buffer += SQLC_SHORT_SIZE;
                            /* Send back the output DA           */
    loc_in_buffer = comm_buffer - ddsacb->buffer;
    rc = sqlcpmd(ddsacb, &loc_in_buffer,
            (char *) (out_da_ptr),
            (unsigned int) SQLDASIZE(out_da_ptr->sqld), sqlca_ptr);
    comm_buffer = ddsacb->buffer + loc_in_buffer;

}
                            /* Find out if there is data to send */
                            /* back, or not.      •              */
                            /* Send the data back.               */
is_there_data = (signed char)
            (((out_da_ptr != NULL) &&
            ((sqlca_changed == SQLC_IS_NULL) ||
            (sqlca_ptr->sqlcode == 0) ||
            (ari && (sqlca_ptr->sqlcode >= 0))))
            ? SQLC_NOT_NULL : SQLC_IS_NULL);
rc = sqlcpcda(ddsacb, &comm_buffer, is_there_data, out_da_ptr, sqlca_ptr);
if (rc != 0)
{
    sqlcpsca((struct sqlca *)dcsra->sqlrcap, "SQLCPSVR",
            (long) SQL_RC_E30080);
    sqlt_system_error(SQLT_SQLC, SQLT_SQLCPSVR, 108, sizeof(short),
            &rc);
    rc = SQLJR_RCF_TERMINATE | SQLJR_RCF_SQLCA;
    goto free_ram;
}

/* Get pointer into comm buffer.     */
                            /* If there is any more data to send.*/
                            /* Get length of buffer.             */
                            /* Byte swap it into the comm buffer */
                            /* length field.                     */
                            /* Send it.                          */
send_last_buf:
    t_count = (unsigned short) (comm_buffer - ddsacb->buffer);
    if (t_count > 2)
    {
        buffer_len = SQLC_SWAP2(t_count);
        sqlzmcpy(ddsacb->buffer, &buffer_len, SQLC_SHORT_SIZE);
        rc = sqlccsen(&ddsacb->comhandle, (short) t_count, ddsacb->buffer);
```

```
        if (rc != 0)
        {
            sqlcperc(&ddsacb->comhandle,sqlca_ptr,"SQLCPSVR");
            sqlt_system_error(SQLT_SQLC, SQLT_SQLCPSVR, 108, sizeof(short),
                      &rc);
            rc = SQLJR_RCF_TERMINATE | SQLJR_RCF_SQLCA;
        }
    }
free_ram:
                                /* If everything fit into the comm    */
                                /* buffer and there was an output DA, */
                                /* we need to free up private SQLDA   */
                                /* space.                             */
    if (allocate_out_da)
    {
        sqlofblk(ddsacb->rsheap, (unsigned) output_da_len, out_da_ptr);
    } if (exec_req_sqlda)
    {
        if (out_da_ptr != NULL)
        {
            sqlefrda(&ddsacb->cb.aacb.sqljacb,out_da_ptr);
        }
    }

/* If we allocated and used any       */
                                /* segments, free them.               */
    if (num_segs_needed > 0)
    {
        for (t_count = 0; t_count < num_segs_needed; t_count++)
        {
            sqlofreeseg((char *) segments[t_count] );
        }
    }

/* Return result of function.         */
    if (rc == 0)
    {
        rc = retcode;
    }
    return (rc);
}

/***********************************************************************/
/* Function name: SQLCPCDA                                             */
/* Function:                                                           */
/*      Copy the data into the comm buffer (including the indicator).  */
/* Input:                                                              */
/*      Pointer to the acb (ddsacb).                                   */
/*      A pointer to the comm buffer pointer.                          */
/*      Indicator if sqlda changed.                                    */
/*      Pointer to the SQLDA.                                          */
/*      Pointer to the SQLCA.                                          */
/* Output:                                                             */
/*      Return codes of move data.                                     */
/*      New location in the comm buffer.                               */
/***********************************************************************/ short SQLZ_LOCAL sqlcpcda(struct sqlcacb *ddsacb, unsigned char **cb,
                  signed char ind, struct sqlda *da_ptr,
                  struct sqlca *sqlca_ptr)
{
    short t_count;              /* Temporary loop counter.            */
    struct sqlvar *t_sqlvar;    /* Pointer to a SQLVAR from SQLDA
*/
    unsigned int loc_in_buffer; /* Location in the comm buffer for the*/
    short rc = 0;               /* Return code.                       */
    unsigned int actual_length; /* Actual length of the data.         */
/*NEW*/
    unsigned short max_data_len; /* Max length of the data            */
/*NEW*/

/* Send back the null indicator.      */
                                /* Move forward in the comm buffer.   */
                                /* If there is data to send back...   */
                                /* (defined as 1: there is an output  */
```

```c
                                    /*          sqlda, AND            */
                                    /*        2: there was no change  */
                                    /*           in the sqlca, OR     */
                                    /*           the sqlcode is not   */
                                    /*           an error).           */
                                    /* For each SQLVAR...             */
                                    /* 1) Get a pointer to the SQLVAR.*/
                                    /* 2) Send the NULL indicator.    */
                                    /* 3) Move forward in the buffer. */
                                    /* 4) Get the actual length of the*/
                                    /*    data.                       */
                                    /* 5) If data is not NULL, send back*/
                                    /*    the data.                   */
                                    /* 6) If an error, stop sending data*/
    sqlzmcpy(*cb, &ind, SQLC_CHAR_SIZE);
    *cb += SQLC_CHAR_SIZE;
    if (ind == SQLC_NOT_NULL)
    {
        for (t_count = 0; t_count < da_ptr->sqld; t_count++)
        {
            t_sqlvar = (struct sqlvar *) &(da_ptr->sqlvar[t_count] );
            if ((t_sqlvar->sqltype & SQL_TYP_NULINC) != 0)
            {
                loc_in_buffer = *cb - ddsacb->buffer;
                rc = sqlcpmd(ddsacb, &loc_in_buffer,
                        (char *) (t_sqlvar->sqlind), SQLC_SHORT_SIZE,
                        sqlca_ptr);
                *cb = ddsacb->buffer + loc_in_buffer;
            }
            actual_length = sqlcpdls(t_sqlvar);
/*NEW*/
            max_data_len = sqlcpdlr(t_sqlvar);
            if (actual_length > max_data_len)
            {
                actual_length = max_data_len;
            }
/*NEW*/
            if (((t_sqlvar->sqltype & SQL_TYP_NULINC) == 0) ||
                (t_sqlvar->sqlind == NULL) ||
                (((short) *(t_sqlvar->sqlind)) >= 0 ))
            {
                loc_in_buffer = *cb - ddsacb->buffer;
                rc = sqlcpmd(ddsacb, &loc_in_buffer, t_sqlvar->sqldata,
                        actual_length, sqlca_ptr);
                *cb = ddsacb->buffer + loc_in_buffer;
            }
            if (rc != 0)
            {
                t_count = da_ptr->sqld;
            }
        }
    }
    return(rc);
}

/****************************************************************************/
/* Function name: SQLCPCCA                                                  */
/* Function:                                                                */
/*      Copy the SQLCA into the comm buffer (we know it fits).              */
/* Input:                                                                   */
/*      A pointer to the comm buffer pointer.                               */
/*      Indicator if sqlca changed.                                         */
/*      Pointer to the SQLCA.                                               */
/* Output:                                                                  */
/*      New location in the comm buffer.                                    */
/****************************************************************************/ void SQLZ_LOCAL sqlcpcca(unsigned char **cb, signed char ind,
                struct sqlca *ca_ptr)

{
                                    /* Copy the SQLCA null indicator. */
                                    /* Move forward in the buffer.    */
                                    /* If SQLCA changed...            */
                                    /* 1) Copy it into the comm buffer.*/
                                    /* 2) Move forward in the comm buffer*/
    sqlzmcpy(*cb, &ind, SQLC_CHAR_SIZE);
    *cb += SQLC_CHAR_SIZE;
    if (ind == SQLC_NOT_NULL)
```

```
{
    sqlzmcpy(*cb, ca_ptr, sizeof(struct sqlca));
    *cb += sizeof(struct sqlca);
  }
}

/***************************************************************************/
/* Function name: SQLCPNRA                                                 */
/* Function:                                                               */
/*       Copy the SQLJRA into a new RA (which we can use for fetch).       */
/*                                                                         */
/* Input:                                                                  */
/* Output:                                                                 */
/***************************************************************************/
void SQLZ_LOCAL sqlcpnra()

{
    struct sqlcp_ccb *temp_ccb;        /* Pointer to CCB for cursor.      */

/* Set the pointer to the CCB.     */
                                       /* Copy the JRA to one that won't get */
                                       /* wiped out.                      */
                                       /* Set up the rest of the fields.  */
    sqlcpcsr(temp_ccb, svr_ccbs, *((unsigned short *) dcsra->sqlrsect),
             dcsra->sqlrcrea,
             (unsigned short) dcsra->sqlrcrel, dcsra->sqlrpgmn,
             (unsigned short) dcsra->sqlrpgml);
    t_jra = *dcsra;
    t_jra.sqlrtype = SQLJR_FETCH;
    t_jra.sqlrflgl = 0;
    t_jra.sqlrflgt = 0;
    t_jra.sqlrflag = NULL;
    t_jra.sqlrdail = 0;
    t_jra.sqlrdait = 0;
    t_jra.sqlrdapi = NULL;
    t_jra.sqlrdaol = output_da_len;
    t_jra.sqlrdaot = SQLJ_TYP_OUTSQLDA;
    t_jra.sqlrdapo = (char *) out_da_ptr;
    t_jra.sqlrcap = (char *) &temp_ccb->fet_ca;
/* NEW */  strncpy(temp_ccb->fet_crea, dcsra->sqlrcrea, (int) dcsra->sqlrcrel);
/* NEW */  t_jra.sqlrcrea = temp_ccb->fet_crea;
/* NEW */  strncpy(temp_ccb->fet_pkg, dcsra->sqlrpgmn, (int) dcsra->sqlrpgml);
/* NEW */  t_jra.sqlrpgmn = temp_ccb->fet_pkg;
/* NEW */  strncpy(temp_ccb->fet_cons, dcsra->sqlrctkp, (int) dcsra->sqlrctkl);
/* NEW */  t_jra.sqlrctkp = temp_ccb->fet_cons;
/* NEW */  temp_ccb->fet_sect = *(unsigned short *)dcsra->sqlrsect;
/* NEW */  t_jra.sqlrsect = (char *) &(temp_ccb->fet_sect);
}

/***************************************************************************/
/* Function name: SQLCPFET                                                 */
/* Function:                                                               */
/*       Fetch rows (for blocking), and put them in the comm buffer.       */
/* Input:                                                                  */
/*       A pointer to the sqlcacb.                                         */
/*       The starting point for output data in the first buffer.           */
/*       Pointer to CCB for the cursor.                                    */
/* Output:                                                                 */
/*       The com buffer will be sent to the server if it is filled         */
/***************************************************************************/ void SQLZ_LOCAL sqlcpfet(struct sqlcacb *ddsacb, unsigned char **start_point,
                         struct sqlcp_ccb *temp_ccb)

{
    unsigned char *next_start;         /* Starting point for the next row. */
    unsigned char *buf_start;          /* Start point of comm buffer.     */
    unsigned char *buf_loc;            /* Current point in buffer.        */
    unsigned int buffer_len;           /* Total buffer len.               */
    unsigned int total_row_len;        /* Total row length for the return */
                                       /* code, null inds, sqlca and data. */
    unsigned short t_count;            /* Temp loop variable.             */
    struct sqlvar *t_sqlvar;           /* Temp sqlvar.                    */
    short num_rows = 0;                /* Number of rows sent.            */
    short done = 0;                    /* Are we done yet?                */
    signed char sqlca_changed;         /* Was the SQLCA changed by the engine*/
    signed char is_there_data;         /* Is there output data to send back? */
    struct sqlca *ca_ptr;              /* Pointer to the SQLCA used for a */
```

```
short terminated = 0;                /* fetch.                              */
                                     /* Is the last row of this data the   */
                                     /* last row overall?                   */
long t_sqlcode;                      /* Temp sqlcode (from last fetch).     */
short no_write;                      /* Don't write the number of rows at   */
                                     /* the end.                            */

/* Get the buffer starting point.      */
                                     /* Get the total buffer length.        */
                                     /* Get the point where the next        */
                                     /* row starts.                         */
                                     /* Get a pointer to the SQLCA.         */
buf_start = ddsacb->buffer;
buffer_len = ddsacb->length;
next_start = *start_point + 2 * SQLC_SHORT_SIZE;
ca_ptr = &temp_ccb->fet_ca;

/* While we can keep going...          */
while (!done)
{
                                     /* Write at end of buffer.             */
  no_write = 0;
                                     /* We need space for the return code   */
                                     /*  and two null indicators.           */
                                     /* Find out if the SQLCA changed.      */
                                     /* If it did, we need to send it over  */
                                     /*  the wire.                          */
                                     /* Loop through the sqlvars...         */
                                     /*  Get the sqlvar.                    */
                                     /*  If the var is nullable, we need    */
                                     /*   to send the indicator.            */
                                     /*  If the var is not nullable or is   */
                                     /*   not null, we need to send the var */
  total_row_len = SQLC_SHORT_SIZE + 2 * SQLC_CHAR_SIZE;
  sqlca_changed = (signed char) ((temp_ccb->fet_rc & SQLJR_RCF_SQLCA)
                        ? SQLC_NOT_NULL : SQLC_IS_NULL);
  if (sqlca_changed == SQLC_NOT_NULL)
  {
    total_row_len += sizeof(struct sqlca);
  }
  is_there_data = (signed char) (((sqlca_changed == SQLC_IS_NULL) ||
                        ((ca_ptr->sqlcode >= 0) &&
                         (ca_ptr->sqlcode != 100)))
                ? SQLC_NOT_NULL : SQLC_IS_NULL);
  if (is_there_data == SQLC_NOT_NULL)
  {
    for (t_count = 0; t_count < temp_ccb->native_da->sqld; t_count++)
    {
      t_sqlvar = (struct sqlvar *) &(temp_ccb->native_da->sqlvar[t_count] );
      if ((t_sqlvar->sqltype & SQL_TYP_NULINC) != 0)
      {
        total_row_len += SQLC_SHORT_SIZE;
      }
      if (((t_sqlvar->sqltype & SQL_TYP_NULINC) == 0) ||
          (t_sqlvar->sqlind == NULL) ||
          (((short) *(t_sqlvar->sqlind)) >= 0))
      {
        total_row_len += sqlcpdls(t_sqlvar);
      }
    }
  }

/* If row will fit...                  */
                                     /* or if row won't fit AND this is     */
                                     /*  a fetch that is blocking AND this  */
                                     /*  is the first row in the buffer...  */
                                     /* If this is a row too big...         */
                                     /*  Set and write the num rows and     */
                                     /*   terminated flags, and we're done  */
                                     /*  Set a pointer in buffer.           */
                                     /*  Copy the return code.              */
                                     /*  Copy the sqlca information.        */
                                     /*  Copy the data information.         */
                                     /*  Copy it in buffer.                 */
                                     /*  Increment number of rows.          */
                                     /*  Move forward in buffer.            */
                                     /*  Save the sqlcode from this fetch.  */
                                     /*  Fetch next row.                    */
```

```c
                                    /* If the row put in buffer is last, */
                                    /*  set done and terminated flags.   */
                                    /* ELSE...                            */
                                    /* Row didn't fit, we are done.       */
    if ((((next_start + total_row_len) - buf_start) <= buffer_len) ||
        ((blocking) && (num_rows == 0)))
    {
        if ((((next_start + total_row_len) - buf_start) > buffer_len) &&
            (blocking) && (num_rows == 0))
        {
            no_write = 1;
            done = 1;
            num_rows = 1;
            terminated = 0;
            sqlzmcpy(*start_point, &num_rows, SQLC_SHORT_SIZE);
            sqlzmcpy(*start_point + SQLC_SHORT_SIZE, &terminated,
                    SQLC_SHORT_SIZE);
        }
        buf_loc = next_start;
        sqlzmcpy(buf_loc, &temp_ccb->fet_rc, SQLC_SHORT_SIZE);
        buf_loc += SQLC_SHORT_SIZE;
        sqlcpcca(&buf_loc, sqlca_changed, ca_ptr);
        sqlcpcda(ddsacb, &buf_loc, is_there_data, temp_ccb->native_da,
                ca_ptr);
        num_rows++;
/* NEW!!! */    next_start = buf_loc;

t_sqlcode = ca_ptr->sqlcode;
        temp_ccb->fet_rc =
/* NEW !!! */       sqledcsr(&(ddsacb->cb.aacb.sqljacb), (SQLJRA
*)&temp_ccb->jra);
        if ((t_sqlcode < 0) || (t_sqlcode == 100))
        {
            done = 1;
            terminated = -1;
        }
    }
    else
    {
        done = 1;
    }
}

/* If we should write out the info.  */
                                    /* Copy number of rows and if the    */
                                    /* last row is the last row.         */
if (!no_write)
{
    sqlzmcpy(*start_point, &num_rows, SQLC_SHORT_SIZE);
    sqlzmcpy(*start_point + SQLC_SHORT_SIZE, &terminated,
SQLC_SHORT_SIZE);
}

/* Return next point to write to in  */
                                    /* buffer.                           */
*start_point = next_start;
}

/* FIX!!! If terminated, issue a close cursor?, and delete the server CCB. */
/* requester then needs to figure it out maybe. */

/****************************************************************************/
/* Function name: SQLCPSVR                                                  */
/* Function:                                                                */
/*      Main server routine to receive a remote request.                    */
/* Input:                                                                   */
/*      DDSACB pointer                                                      */
/* Output:                                                                  */
/*      Return code of status of operation.                                 */
/****************************************************************************/ short SQLZ_DYNLINK sqlcpsvr(struct sqlcacb *ddsacb)

{
    short retcode;
    struct SQLRA *t_ra;
    void *    new_stack;
    short     *rcptr;
    unsigned char rqstr_procid[SQLC_THRDIDSZ];
```

```c
unsigned short procid;
unsigned short threadid;
unsigned short apid_length;

/* Module entry trace record.        */
sqlt_fnc_entry(SQLT_SQLC, SQLT_SQLCPSVR);
sqlt_perf_entry(SQLT_SQLC, SQLT_SQLCPSVR, 1, 0, NULL);
                                    /* Module entry trace record.        */
rcptr = &retcode;

/* Receive the SQL request.          */
                                    /* If received OK...                 */
                                    /* If operational status...          */
                                    /* Set up SQLRA and perform opstat.  */
                                    /* Note: The opstat interface was    */
                                    /*  converted to the SQLJRA interface.*/
                                    /*  and there isn't time right now to */
                                    /*  do it. That is why we are simply */
                                    /*  creating an RA, and using the old */
                                    /*  code. When there's time it would */
                                    /*  be better to do it the way that  */
                                    /*  all the rest of the code works.  */
                                    /* ELSE...                           */
                                    /*  If it is not a blocking cursor   */
                                    /*   fetch operation... (blocking    */
                                    /*   fetches are handled at the end of*/
                                    /*   the receive routine).           */
                                    /*  Call the DCS router to perform   */
                                    /*   the request.                    */
                                    /*  Send back the reply.             */
retcode = sqlcpsvr_receive(ddsacb);
if (retcode == 0)
{
   if (op_stat)
   {
      t_ra = &(ddsacb->cb.aacb.sqlra);
      t_ra->SQLRTYPE = SQLC_RT_OPSTAT;
      t_ra->SQLRCAP = (struct sqlca *) dcsra->sqlrcap;
      t_ra->SQLRDTP1 = ((struct sqlda *)
                       (dcsra->sqlrdapo))->sqlvar F0 .sqldata;
      t_ra->SQLRDTL1 = ((struct sqlda *)
                       (dcsra->sqlrdapo))->sqlvar F0 .sqllen;
      t_ra->SQLRDTP2 = dcsra->sqlrdata F0 .sqlrdtp;
/*NEW*/
      retcode = sqlcpdbs(ddsacb);
/*NEW*/
         if (retcode < 0)
         {
            retcode = SQLJR_RCF_SQLCA;
         }
         else
            if ( ((struct sqlca *)(dcsra->sqlrcap))->sqlcode != 0)
            {
               retcode |= SQLJR_RCF_SQLCA;
            }
   }
   else
   {
      if (!blocking)
      {
         if (start_using)
         {
            apid_length = (unsigned short)
                       (dcsra->sqlrdata FSQLJ_APN_OFF .sqlrdtl
                         < SQLC_THRDIDSZ) ?
                       dcsra->sqlrdata FSQLJ_APN_OFF .sqlrdtl
                         : SQLC_THRDIDSZ;
            sqlzmcpy(rqstr_procid,
                    (char *)dcsra->sqlrdata FSQLJ_APN_OFF .sqlrdtp,
                    apid_length);
            fromextnam(rqstr_procid, &procid, &threadid);
            sqltspid(procid);
            /* allocate new stack */
            if ((retcode = sqlzastk (&new_stack, SQLZ_RDI_STACK_SZ)) != 0)
            {
               sqlcpsca((struct sqlca *)dcsra->sqlrcap, "SQLCPSVR",
                       (long) SQLE_RC_INSSYS);
               sqlt_trace_error(SQLT_SQLC, SQLT_SQLCPSVR, 113,
                       sizeof(short), &retcode);
```

```
                retcode = SQLJR_RCF_SQLCA | SQLJR_RCF_TERMINATE;
        }
        else
        {
                                /* prepare to pass rc after stack
                                        switch                       */
                rcptr = &retcode;
                                /* change to new stack. The last
                                        parameter is the size of parms
                                        passed to this routine        */
                sqlzstsw (new_stack, SQLZ_RDI_STACK_SZ, sizeof(ddsacb));

retcode = sqledcsr(&(ddsacb->cb.aacb.sqljacb),
                                (SQLJRA *)dcsra);
                                /* change to old stack & free new one */
                *rcptr=retcode;
                sqlzswst (new_stack, SQLZ_RDI_STACK_SZ, sizeof(ddsacb));
                sqlzfstk (new_stack);
        }
    }
    else
    {
                                /*For open cursor request, check to see*/
                                /*whether blocking is requested. If    */
                                /*the requestor requests blocking, set */
                                /*the SQLDA flag on in dcsra           */
                                /*Decrement the indicator array triplet*/
                                /*length by 1 since the blocking flag  */
                                /*is used only by JRA requestor and    */
                                /*server                               */
        if (open_cursor)
        {
            if (dcsra->sqlrflag FSQLCP_OFF_BLKREQ  ==
SQLCP_BLOCK )
            {
                dcsra->sqlrflag FSQLJ_CSRDA_OFF  =
SQLJ_OUTSQLDA;
            }
            dcsra->sqlrflgl--;

}
        retcode = sqledcsr(&(ddsacb->cb.aacb.sqljacb),
                        (SQLJRA *)dcsra);
        }
    }
}
if (retcode & SQLJR_RCF_TERMINATE)
{
    error_found = 1;
}
retcode = sqlcpsvr_send(ddsacb, retcode);

/* Generate module exit trace.   */
                                /* Send back the return code.    */
sqlt_fnc_retcode(SQLT_SQLC, SQLT_SQLCPSVR, retcode);
sqlt_perf_exit(SQLT_SQLC, SQLT_SQLCPSVR, 2, 0, NULL);
                                /* Send back the return code.    */
return(retcode);
}
```

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. An apparatus for constructing a memory requirement data structure, from a data structure, in a first memory on a first computer to access information from a database on a second computer, comprising:
   (a) means for determining values of said memory requirement data structure from said data structure on said first computer;
   (b) means for constructing said memory requirement data structure in said first memory from said values;
   (c) means for transmitting said memory requirement data structure to a second memory in said second computer;
   (d) means for calculating a total memory requirement from said memory requirement data structure stored in said second memory; and
   (e) means for determining if additional memory is needed in said second computer to reconstruct said data structure based on said total memory requirement.

2. A method for constructing a memory requirement data structure, from a data structure, in a first memory on a first computer to access information from a database on a second computer, comprising the steps of:
- (a) determining values of said memory requirement data structure from said data structure on said first computer;
- (b) constructing said memory requirement data structure in said first memory from said values;
- (c) transmitting said memory requirement data structure to a second memory in said second computer;
- (d) calculating a total memory requirement from said memory requirement data structure stored in said second memory; and
- (e) determining if additional memory is needed in said second computer to reconstruct said data structure based on said total memory requirement.

3. The apparatus as recited in claim 1, wherein said data structure comprises:
control structures
input and output data; and
a plurality of input and output variables.

4. The apparatus as recited in claim 3, wherein said means for determining values of said memory requirement data structure comprises:
means for determining a total length of said control structures;
means for determining a total length of said input and output data;
means for determining a number of said input and output variables; and
means for determining a length of each of said variables.

5. The apparatus as recited in claim 1, wherein said first memory is a communication buffer.

6. The apparatus as recited in claim 1, wherein said second memory is a communication buffer.

7. The apparatus as recited in claim 1, wherein said means for determining if additional memory is needed to reconstruct said data structure based on said total memory requirement comprises:
if said total memory requirement is not greater than 4000 bytes, means for reconstructing said data structure in said second memory.

8. The apparatus as recited in claim 7, wherein said means for determining if additional memory is needed to reconstruct said data structure based on said total memory requirement further comprises:
if said total memory requirement is greater than 4000 bytes but less than 64000 bytes, means for allocating one buffer to reconstruct said data structure.

9. The apparatus as recited in claim 8, wherein said means for determining if additional memory is needed to reconstruct said data structure based on said total memory requirement further comprises:
if said total memory requirement is greater than 64000 bytes, means for allocating three buffers to reconstruct said data structure.

10. The method as recited in claim 2, wherein said data structure comprises:
control structures;
input and output data; and
a plurality of input and output variables.

11. The method as recited in claim 10, wherein said step of determining values of said memory requirement data structure comprises the steps of:
determining total length of said control structures;
determining a total length of said input and output data;
determining a number of said input and output variables; and
determining a length of each variable.

12. The method as recited in claim 2, wherein said first memory is a communication buffer.

13. The method as recited in claim 2, wherein said second memory is a communication buffer.

14. The method as recited in claim 2, wherein said step of determining if additional memory is needed to reconstruct said data structure based on said total memory requirement comprises the step of:
if said total memory requirement is not greater than 4000 bytes, reconstructing said data structure in said second memory.

15. The method as recited in claim 14, wherein said step of determining if additional memory is needed to reconstruct said data structure based on said total memory requirement further comprises the step of:
if said total memory requirement is greater than 4000 bytes but less than 64000 bytes, allocating one buffer to reconstruct said data structure.

16. The method as recited in claim 2, wherein said step of determining if additional memory is needed to reconstruct said data structure based on said total memory requirement further comprises the step of:
if said total memory requirement is greater than 64000 bytes, allocating three buffers to reconstruct said data structure.

* * * * *